US012232210B2

(12) United States Patent
Chen et al.

(10) Patent No.: US 12,232,210 B2
(45) Date of Patent: Feb. 18, 2025

(54) SYSTEMS AND METHODS FOR MANAGING RADIO BEARER COMPATIBILITY IN A COMMUNICATION NETWORK

(71) Applicant: GOOGLE LLC, Mountain View, CA (US)

(72) Inventors: Teming Chen, Taoyuan (TW); Chih-Hsiang Wu, Taoyuan (TW)

(73) Assignee: GOOGLE LLC, Mountain View, CA (US)

(*) Notice: Subject to any disclaimer, the term of this patent is extended or adjusted under 35 U.S.C. 154(b) by 357 days.

(21) Appl. No.: 17/765,506

(22) PCT Filed: Sep. 28, 2020

(86) PCT No.: PCT/US2020/052997
§ 371 (c)(1),
(2) Date: Mar. 31, 2022

(87) PCT Pub. No.: WO2021/067149
PCT Pub. Date: Apr. 8, 2021

(65) Prior Publication Data
US 2022/0353950 A1    Nov. 3, 2022

Related U.S. Application Data

(60) Provisional application No. 62/924,207, filed on Oct. 22, 2019, provisional application No. 62/909,306, filed on Oct. 2, 2019.

(51) Int. Cl.
*H04W 76/32* (2018.01)
*H04W 76/19* (2018.01)
*H04W 76/20* (2018.01)

(52) U.S. Cl.
CPC .......... *H04W 76/32* (2018.02); *H04W 76/19* (2018.02); *H04W 76/20* (2018.02)

(58) Field of Classification Search
CPC ...... H04W 76/19; H04W 76/20; H04W 76/32
See application file for complete search history.

(56) References Cited

U.S. PATENT DOCUMENTS 8,964,699 B2 * 2/2015 Wu ....................... H04W 76/19
455/450
9,661,526 B2 * 5/2017 Kim .................. H04W 74/0833
(Continued)

FOREIGN PATENT DOCUMENTS

EP         2 357 873 A1     8/2011
WO    WO-2019031948 A1     2/2019
(Continued)

OTHER PUBLICATIONS

3GPP TS 37.340 V15.7.0; Technical Specification Group Radio Access Network; Evolved Universal Terrestrial Radio Access (E-UTRA) and NR; Multi-connectivity; Stage 2 (Release 15) Sep. 28, 2019.
(Continued)

*Primary Examiner* — Eric Nowlin
(74) *Attorney, Agent, or Firm* — MARSHALL, GERSTEIN & BORUN LLP

(57) ABSTRACT

A user device (UE) for managing radio bearers communicates, with a first base station over a first radio bearer associated with a dedicated control channel and configured to carry at least application-layer measurement reporting information, the radio bearer associated with a logical channel identity (2502); receives, from a radio access network (RAN) including the first base station and a second base station, a message related to (i) the first radio bearer or (ii) a second radio bearer having the logical channel identity and terminated at the second base station (2504); and release or reconfigure the first radio bearer in response to the message (2506).

12 Claims, 29 Drawing Sheets

(56) References Cited

U.S. PATENT DOCUMENTS

| | | | |
|---|---|---|---|
| 10,039,086 B2* | 7/2018 | Baek | H04B 7/024 |
| 10,687,263 B2* | 6/2020 | Paladugu | H04W 12/033 |
| 10,791,480 B2* | 9/2020 | Kim | H04W 74/08 |
| 11,678,396 B2* | 6/2023 | Ingale | H04W 36/0069 370/329 |
| 2008/0311892 A1* | 12/2008 | Lee | H04W 72/30 455/414.1 |
| 2012/0281613 A1* | 11/2012 | Jactat | H04W 76/30 370/312 |
| 2012/0307741 A1* | 12/2012 | Wu | H04W 76/19 370/328 |
| 2015/0131578 A1* | 5/2015 | Baek | H04B 7/024 370/329 |
| 2017/0013668 A1 | 1/2017 | Chang et al. | |
| 2017/0257792 A1* | 9/2017 | Kim | H04W 28/0289 |
| 2017/0339531 A1* | 11/2017 | Kim | H04W 76/40 |
| 2018/0092156 A1 | 3/2018 | Kim et al. | |
| 2019/0090144 A1* | 3/2019 | Wu | H04L 5/0098 |
| 2019/0253945 A1* | 8/2019 | Paladugu | H04W 36/18 |
| 2020/0280875 A1* | 9/2020 | Kim | H04W 74/08 |
| 2022/0353950 A1* | 11/2022 | Chen | H04W 76/20 |
| 2023/0284058 A1* | 9/2023 | Eklöf | H04W 24/08 370/252 |

FOREIGN PATENT DOCUMENTS

| | | | | |
|---|---|---|---|---|
| WO | WO-2019/066628 A1 | 4/2019 | | |
| WO | WO-2019/166032 A1 | 9/2019 | | |
| WO | WO-2022005360 A1 * | 1/2022 | | H04W 24/08 |

OTHER PUBLICATIONS

3GPP TS 36.331 V15.7.0; Technical Specification Group Radio Access Network; Evolved Universal Terrestrial Radio Access (E-UTRA); Radio Resource Control (RRC); Protocol specification (Release 15) Sep. 27, 2019.

International Search Report and Written Opinion for Application No. PCT/US2020/052997, dated Dec. 21, 2020.

3GPP TS 36.331 V15.6.0; Technical Specification; LTE; Evolved Universal Terrestrial Radio Access (E-UTRA); Radio Resource Control (RRC); Protocol specification (Release 15) Jul. 2019.

Office Action for Taiwan Application No. 111119845, dated Jun. 30, 2022.

"3rd Generation Partnership Project; Technical Specification Group Radio Access Network; NR; Radio Resource Control (RRC) protocol specification (Release 15)," 3GPP TS 38.331 V15.6.0 (2019).

Samsung, "Changes related to CA and or DC duplication," 3GPP TSG RAN2 Meeting #105 R2-1902703 Athens, Greece (2019).

* cited by examiner

SYSTEMS AND METHODS FOR MANAGING RADIO BEARER COMPATIBILITY IN A COMMUNICATION NETWORK

FIELD OF THE DISCLOSURE

This disclosure relates to a wireless communications system, more particularly, to a wireless communications system that manages radio bearer compatibility when a User Equipment (UE) establishes or re-establishes a radio connection with a base station.

BACKGROUND

The background description provided in this disclosure is for the purpose of generally presenting the context of the disclosure. Work of the presently named inventors, to the extent described in this background section, as well as aspects of the description that may not otherwise qualify as prior art at the time of filing, are neither expressly nor impliedly admitted as prior art against the present disclosure.

In a wireless communication system, a base station that supports a certain Radio Access Technology (RAT) communicates with a user equipment (UE) using, among other protocols, a protocol for controlling radio resources corresponding to the RAT. The protocol for controlling radio resources may be, for example, a Radio Resource Control (RRC) protocol utilized by 4G, 5G, 6G, or later-generation wireless communication systems. Upon establishing a radio connection via the base station, the UE operates in a connected state of the protocol for controlling radio resources, which may be RAT-specific (e.g., EUTRA-RRC CONNECTED, NR-RRC CONNECTED).

The UE and the base station can use signaling radio bearers (SRBs) to exchange RRC messages as well as non-access stratum (NAS) messages. There are several types of SRBs: SRB1 resources carry RRC messages and in some cases NAS messages over a dedicated control channel (DCCH); SRB2 resources support RRC messages that include logged measurement information or NAS messages, also over the DCCH but with lower priority than SRB1 resources; SRB3 resources support RRC messages related to measurement configuration and reporting, for example, of a secondary cell group (SCG) when the UE operates in dual connectivity (DC); and SRB4 resources support RRC messages that include application-layer measurement reporting information, also over the DCCH.

Further, the UE and the base station use data radio bearers (DRBs) to transport data on a user plane.

There are several scenarios in which the (first) base station and/or the UE determines that the UE should establish a radio connection with another (second) base station. For example, the first base station can determine to hand the UE over to the second base station, and initiate a handover procedure. In another scenario, the UE can detect radio link failure (RLF) on the radio connection with the first base station and subsequently select the second base station for re-establishing the radio connection. In yet another scenario, the first base station can detect a below-threshold activity for the UE over some period of time over the established connection and instruct the UE to transition to an inactive state of the RAT protocol (e.g., EUTRA-RRC INACTIVE, NR-RRC INACTIVE). At a later time, such as when the UE has moved into a different coverage area and has payload data to transmit to the wireless communication system, the UE operating in the inactive state selects or reselects the second base station and subsequently transitions back to the connected state.

In some of these scenarios, the UE and the first base station use an SRB4, which the second base station may not support. The second base station is generally unaware of an unsupported configuration of an SRB and, as a result, the second base station may provide a configuration to the UE that conflicts with the SRB4 configuration, or the UE can continue using the SRB4 to transmit information which the second base station does not process.

As a more particular example, an SRB or a DRB has a distinct logical channel identity. For example, an SRB4 can have a logical channel identity value of "4." When the second base station supports SRB4s, the second base station is aware of the logical channel identity value which the first base station assigned to the SRB4 of the UE. Accordingly, when the second base station configures a new radio bearer for the UE, the second base station does not use the logical channel identity value already assigned to the SRB4. However, when the second base station does not support the SRB4 configuration, the second base station is unaware of the existence of the SRB4 configuration and its logical channel identity value. As a result, the second base station can associate a DRB with the same logical channel identity value the first base station assigned to the SRB4. This conflict in logical channel identity assignment can result in communication failure between the UE and the second base station.

Further, when the second base station supports SRB4s, the second base station in some cases can apply full configuration to the radio connection between the UE and the second base station. For example, the second base station can provide the full configuration when the second base station does not recognize at least one configuration of the connection, or when the second base station attempts to conserve processing resources by not filtering through the configuration(s) associated with the connection between the UE and the first base station. As another example, the second base station can be manufactured or operated by a different entity than the first base station. The 3rd Generation Partnership Project (3GPP) specification, and specifically 3GPP TS 36.331 v15.7.0, does not address the scenario in which the second base station provides a UE with a full configuration that involves an SRB4. Different UEs thus can handle the full configuration differently, and the second base station and the UE as a result can fail to communicate properly.

SUMMARY

In a radio access network (RAN) of this disclosure, a first base station (e.g., an evolved NodeB (eNB)) configures a UE with an SRB4, and the UE subsequently establishes or re-establishes a radio connection with a second base station (e.g., another eNB), as a part of a handover procedure, a connection re-establishment procedure, a connection resume procedure, etc. The second base station in some of the implementations causes the UE to release the SRB4 and establish a radio bearer of another type to communicate with the second base station. In other implementations, the second base station causes the UE to reconfigure the SRB4 for communicating with the second base station.

In various implementations, the second base station causes the UE to release the SRB4 by including a configuration for a DRB, omitting a configuration for the SRB4, including an explicit indicator instructing the UE to release the SRB4, omitting an explicit indicator instructing the UE to keep the SRB4, providing a full configuration that omits the SRB4 configuration, etc. The second base station can use one of these techniques when formatting a handover command, an RRC reconfiguration command, an RRC resume command, etc. Because the second base station in at least some of these scenarios communicates with the UE via the first base station, the first base station in some implementations modifies the message the second base station addresses to the UE. By causing the UE to release the SRB4 before applying the DRB configuration, the second base station prevents the UE from using the same logical channel identity with two different radio bearers.

In another implementation, the UE reconfigures the SRB4 in accordance with a message from the second base station. The term "reconfigure" as used herein can refer to the UE (i) reconfiguring an existing SRB4 to generate a new SRB4 configuration for use with the second base station or (ii) releasing the existing SRB4 and generating a new SRB4 according to a new configuration provided by the second base station. That is, if the second base station supports SRB4, the second base station can transmit the message that includes the new SRB4 configuration to cause the UE to replace the SRB4 configuration previously provided by the first base station with the new SRB4 configuration. If the second base station does not support SRB4, the second base station can transmit the message that includes the configuration for a DRB to the UE, causing the UE to release the SRB4 before applying the DRB configuration.

Generally, the techniques disclosed in this disclosure apply to wireless communication systems having one or more Radio Access Networks that support the same or different types of Radio Access Technologies (RATs), e.g., via unlicensed portions of the radio spectrum, such as the fourth generation of mobile or cellular data technology ("4G"), 4G in accordance with the Long-Term Evolution standard ("4G-LTE"), the fifth generation of mobile or cellular data technologies (referred to as "5G"), 5G New Radio ("NR" or "NR-U"), 5G Evolved Universal Terrestrial Radio Access ("EUTRA" or "E-UTRA"), the sixth generation of mobile or cellular data technologies ("6G"), etc. The various different types of radio access technologies may be connected to any suitable type of Core Network ("CN"), such as an Evolved Packet Core Network ("EPC"), a generation of Core Network subsequent to EPC (such as 5GC), a generation of Core Network later than 5GC, etc.

An example embodiment of these techniques is a method in a UE for managing radio bearers. The method includes communicating, with a first base station over a first radio bearer associated with a dedicated control channel and configured to carry at least application-layer measurement reporting information, the radio bearer associated with a logical channel identity. The method further includes receiving, from a radio access network (RAN) including the first base station and a second base station, a message related to (i) the first radio bearer or (ii) a second radio bearer having the logical channel identity and terminated at the second base station. The method further includes releasing or reconfiguring the first radio bearer in response to the message.

Another example embodiment of these techniques is a UE with processing hardware configured to implement the method above.

An example embodiment of these techniques is a method in a radio access network (RAN) including a first base station that supports radio bearers of a first type and a second base station that does not support radio bearers of the first type. The method includes determining that a UE configured with a first radio bearer of the first type, the radio bearer terminated at the first base station, is to obtain a radio connection to the second base station. The method further includes sending a message to cause the UE to release the first radio bearer and establish a second radio bearer of a second type, terminated at the second base station.

Another example embodiment of these techniques is a base station with processing hardware configured to implement the method above.

Another example embodiment of these techniques is a RAN including a first base station and a second base station with processing hardware configured to implement the method above.

DETAILED DESCRIPTION

The techniques described in this disclosure apply to a certain type of a radio bearer, an SRB4, when the UE establishes or re-establishes a radio connection with a base station. However, these techniques also can apply to other radio bearers which some but not all of the base stations operating in a RAN support.

Figure 1:
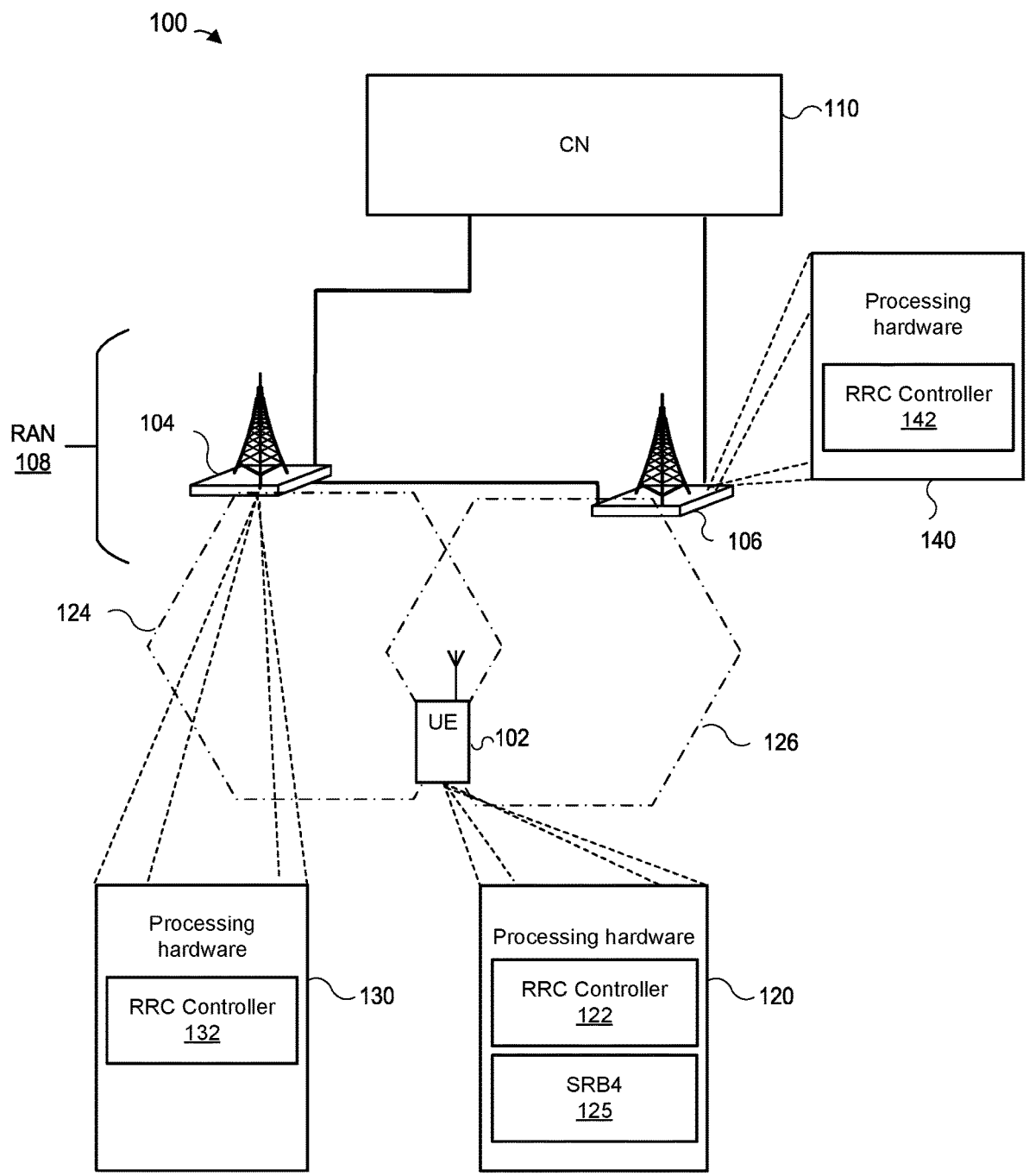
FIG. 1 depicts an example wireless communication system in which a UE, configured with an SRB4, communicates with a RAN, which manages SRB4 when the UE establishes, resumes or re-establishes a radio connection with a base station, in accordance with at least some of the principles and techniques disclosed in this disclosure.

As illustrated in FIG. 1, the system 100 includes a first base station 104 and a second base station 106 of a RAN 108 that each supports a same or different RAT. For example, base station 104 may support NR, and base station 106 may support EUTRA, or vice versa. Generally speaking, a base station that supports an NR RAT operates as a gNodeB (gNB), and a base station that supports an E-UTRA RAT and connects to a 5GC Core Network (E-UTRA/5GC) operates as a next generation evolved Node B (ng-eNB). A base station that supports an E-UTRA RAT and connects to an EPC Core Network (E-UTRA/EPC) operates as an evolved NodeB (eNB), and a base station that supports both E-UTRA/EPC and E-UTRA/5GC operates as both an ng-eNB and an eNB. Each base station 104, 106 may communicatively connect to the same CN (e.g., EPC or 5GC) or different core networks (EPC and 5GC). Base station 104 supports a cell 124, and base station 106 supports a cell 126. The cells 124 and 126 may partially overlap, as illustrated in FIG. 1.

Each base station 104, 106 may support other types of Radio Access Technologies instead of or in addition to NR and/or EUTRA. Although FIG. 1 illustrates two base stations 104, 106 that are connected to a single CN 110, the system 100 may be configured with any number of base stations supporting any number of RANs, each of which is respectively connected to any number of CNs.

Base station 104 and UE 102 establish a connection via which data payload is transmitted between UE 102 and base station 104, e.g., wirelessly. Upon establishing the connection via base station 104, UE 102 is in a connected state of the RAT protocol for controlling radio resources (e.g., EUTRA-RRC_CONNECTED, NR-RRC CONNECTED). Base station 104 maintains a context of UE 102, where the context of the UE 102 includes configuration and other information associated with the connection of UE 102 with base station 104. The context of UE 102 may be included in or implemented as an AS, for example. The context of UE 102 may include configurations of an SRB1, an SRB2, an SRB4, a DRB, and/or other configurations (e.g., security configuration) associated with the connection between UE 102 and base station 104.

At some point in time, UE 102 establishes, resumes or re-establishes a radio connection with base station 106 for servicing. This may occur in various scenarios. In one scenario ("the handover scenario"), base station 104 may determine that UE 102 is to handover to base station 106. In another scenario ("the re-establishment scenario"), UE 102 may detect radio link failure (RLF) over the established connection with base station 104 or detect integrity check failure on the SRB1, SRB2 or SRB4, and subsequently select base station 106 for servicing. In yet another scenario ("the re-selection scenario"), base station 104 may detect that below-threshold or no-data activity for UE 102 has occurred over some interval of time over the established connection. Upon this detection, base station 104 instructs UE 102 to enter into an inactive state of the RAT protocol (e.g., EUTRA-RRC INACTIVE, NR-RRC INACTIVE). At some point in time thereafter, such as when UE 102 has moved into a different coverage area and has payload data to transmit to the system, UE 102 (which is in the inactive state) selects or reselects base station 106 for servicing.

In each of the scenarios described above, a new connection is established between UE 102 and base station 106, which causes base station 106 to create a second instance of the context or AS of UE 102, and populate the second instance of the context/AS with configuration information associated with the connection between UE 102 and base station 106. In some cases, base station 106 may not support or recognize at least one configuration (e.g., an SRB4 configuration) associated with the connection between UE 102 and base station 104, and therefore, base station 106 is generally unaware of such unsupported or unrecognizable configurations. In some cases, base station 106 may support or recognize the configurations associated with the connection between UE 102 and base station 104, yet provide its own configurations (e.g., full configuration, delta configuration) to UE 102, and base station 106 stores information gathered during these procedures and the locally-accessible second instance of the context/AS.

In each of the scenarios described above, base station 106 is configured to include or omit an indication in the message for releasing or reconfiguring the SRB4 configuration from the context of UE 102 maintained by base station 104. For example, in the handover scenario, the re-establishment scenario, or the re-selection scenario, base station 106 is configured to include or omit an indication in a Handover Command message, an RRC Reconfiguration message, or a RRC Resume message, respectively, for releasing or reconfiguring the SRB4 configuration.

UE 102 is equipped with processing hardware 120 that can include one or more general-purpose processors such as CPUs and non-transitory computer-readable memory storing machine-readable instructions executable on the one or more general-purpose processors, and/or special-purpose processing units. The processing hardware 120 in an example implementation includes an RRC controller 122 configured to receive messages from the base stations 104, 106 during the handover scenario, the re-establishment scenario, or the re-selection scenario and release or reconfigure an existing SRB4 125 (i.e., maintained by base station 104) stored in non-transitory computer-readable memory in response to the messages in accordance with one or more of the methods, principles, and techniques disclosed in this disclosure.

Base station 104 is equipped with processing hardware 130 that can include one or more general-purpose processors such as CPUs and non-transitory computer-readable memory storing machine-readable instructions executable on the one or more general-purpose processors, and/or special-purpose processing units. The processing hardware 130 in an example implementation includes an RRC controller 132 configured to initiate the handover scenario or the re-selection scenario in accordance with one or more of the methods, principles, and techniques disclosed in this disclosure.

Base station 106 is equipped with processing hardware 140 that can include one or more general-purpose processors such as CPUs and non-transitory computer-readable memory storing machine-readable instructions executable on the one or more general-purpose processors, and/or special-purpose processing units. The processing hardware 140 in an example implementation includes an RRC controller 142 configured to complete the handover scenario, the re-establishment scenario, or the re-selection scenario in accordance with one or more of the methods, principles, and techniques disclosed in this disclosure.

Although not shown, processing hardware 120, 130, 140 may include UE and base station interfaces via which the processing hardware 120, 130, 140 may communicate with each other.

FIGS. 2A-2B and 3-8 generally illustrate example message flow diagrams of the handover scenario between UE 102 and base stations 104, 106 of wireless communication system 100.

Figure 2A:
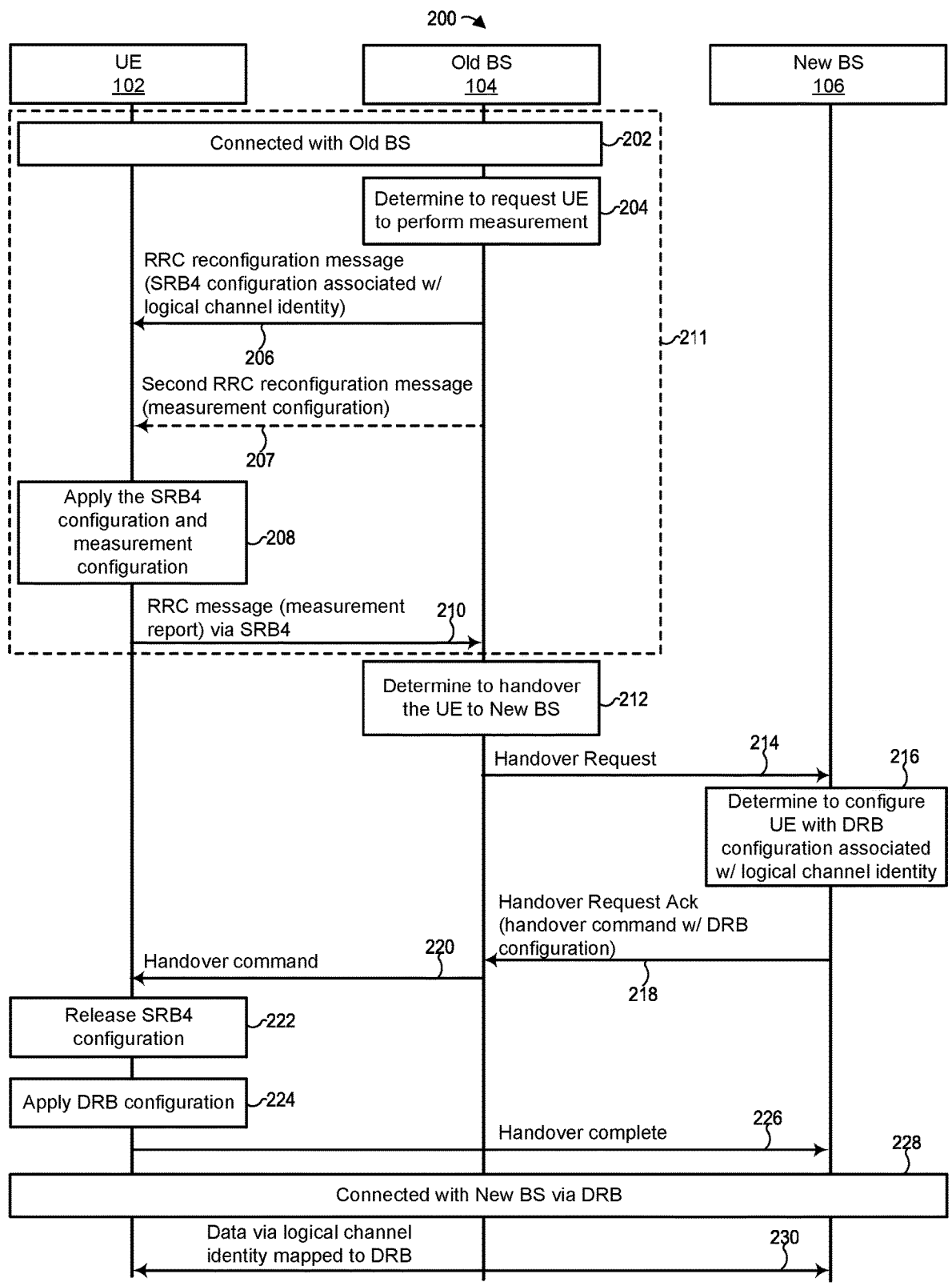
FIG. 2A illustrates an example message flow diagram of a handover scenario in which a base station determines to include a configuration for a DRB in a message associated with a handover procedure to release SRB4 before the handover scenario is complete, in accordance with the techniques of this disclosure.

Turning now to FIG. 2A, at the beginning of a scenario 200, RRC controller 122 of UE 102 and RRC controller 132 of base station 104 perform 211 a measurement procedure to establish a manner in which UE 102 performs measurements and provides results of the measurements in a report to base station 104. To begin performing 211 the measurement procedure, UE 102 operates 202 in a connected state (e.g., EUTRA-RRC_CONNECTED, NR-RRC CONNECTED) with base station 104. When base station 104 determines 204 to request UE 102 to perform a measurement (e.g., an application layer measurement report (e.g., a qoe-MeasReport), MDT measurement report, SON measurement report, RLF measurement report, RACH measurement report, connection establishment failure report and/or mobility history report) and provide a corresponding report to base station 104 via a particular SRB4, base station 104 transmits 206 an RRC Reconfiguration message to UE 102. In some embodiments, the RRC Reconfiguration message includes an SRB4 configuration that is associated with a particular logical channel identity value (e.g., "4"), and a measurement configuration (e.g., an application layer measurement configuration, MDT measurement configuration or/and a SON measurement configuration). In other embodiments, base station 104 can include and transmit 207 the measurement configuration in a second RRC Reconfiguration message.

In response, UE 102 applies 208 the SRB4 configuration and measurement configuration, and proceeds to perform measurements and generate a report. To transmit the requested report, UE 102 includes the report in an RRC message (e.g., a MeasReportAppLayer message, UEInformationResponse message, a UEAssistanceInformation message, or newly defined RRC message) and transmits 210 the RRC message to base station 104 via the configured SRB4 (associated with logical channel identity value 4), thereby completing 211 the measurement procedure. In one embodiment, the newly defined RRC message may contain a segment of an RRC message.

After a period of time, base station 104 determines 212 to handover UE 102 to base station 106. Accordingly, base station 104 transmits 214 a Handover Request message to base station 106. In response, base station 106 determines 216 to configure UE 102 with a DRB configuration associated with the same logical channel identity value as the configured SRB4, either because base station 106 does not support or is otherwise unaware of the configured SRB, or because base station 106 supports the configured SRB4 yet intends to release the configured SRB4 (i.e., hence the logical channel identity value that was assigned to the configured SRB4 is available for assignment by base station 106). Base station 106 includes a configuration for a DRB in a Handover Command message, and subsequently transmits 218 a Handover Request Acknowledge message including the Handover Command message (e.g., an RRCConnectionReconfiguration message, an RRCReconfiguration message) to base station 104. In turn, base station 104 transmits 220 the Handover Command message to UE 102.

The Handover Command message causes UE 102 to release 222 the SRB4 and apply 224 the DRB configuration indicated in the Handover Command message. Accordingly, and advantageously, UE 102 validates the Handover Command message because the logical channel identity value associated with the DRB configuration is only associated with the DRB configuration and not the SRB4 configuration. In some embodiments, UE 102 can also release the measurement configuration provided by base station 104 at events 206 or 207.

In turn, UE 102 transmits 226 a Handover Complete message (e.g., an RRCConnectionReconfigurationComplete message, an RRCReconfigurationComplete message) to base station 106, thereby successfully completing the handover scenario. Accordingly, UE 102 operates 228 in a connected state with base station 106, and therefore UE 102 and base station 106 can exchange 230 data via the logical channel identity mapped to the DRB. For example, UE 102 can transmit a packet (e.g., an internet protocol (IP) packet) via the DRB. The UE 102 can transmit a measurement report or other suitable report in a Packet Data Convergence Protocol (PDCP) Protocol Data Unit (PDU) to base station 106 via the DRB (i.e., instead of the previously configured SRB4 due to releasing the SRB4 configuration). Particularly, UE 102 can generate a PDCP SDU including the report, encrypt the PDCP SDU, and construct a PDCP PDU including the encrypted PDCP SDU according to the DRB configuration. UE 102 transmits the PDCP PDU associated to the DRB to base station 106. In response, base station 106 successfully processes the PDCP PDU according to the DRB configuration. Similarly, UE 102 can receive a PDCP PDU associated to the DRB from base station 106 and successfully process the PDCP PDU according to the DRB configuration (i.e., instead of the SRB4 configuration due to releasing the SRB4 configuration).

Figure 2B:
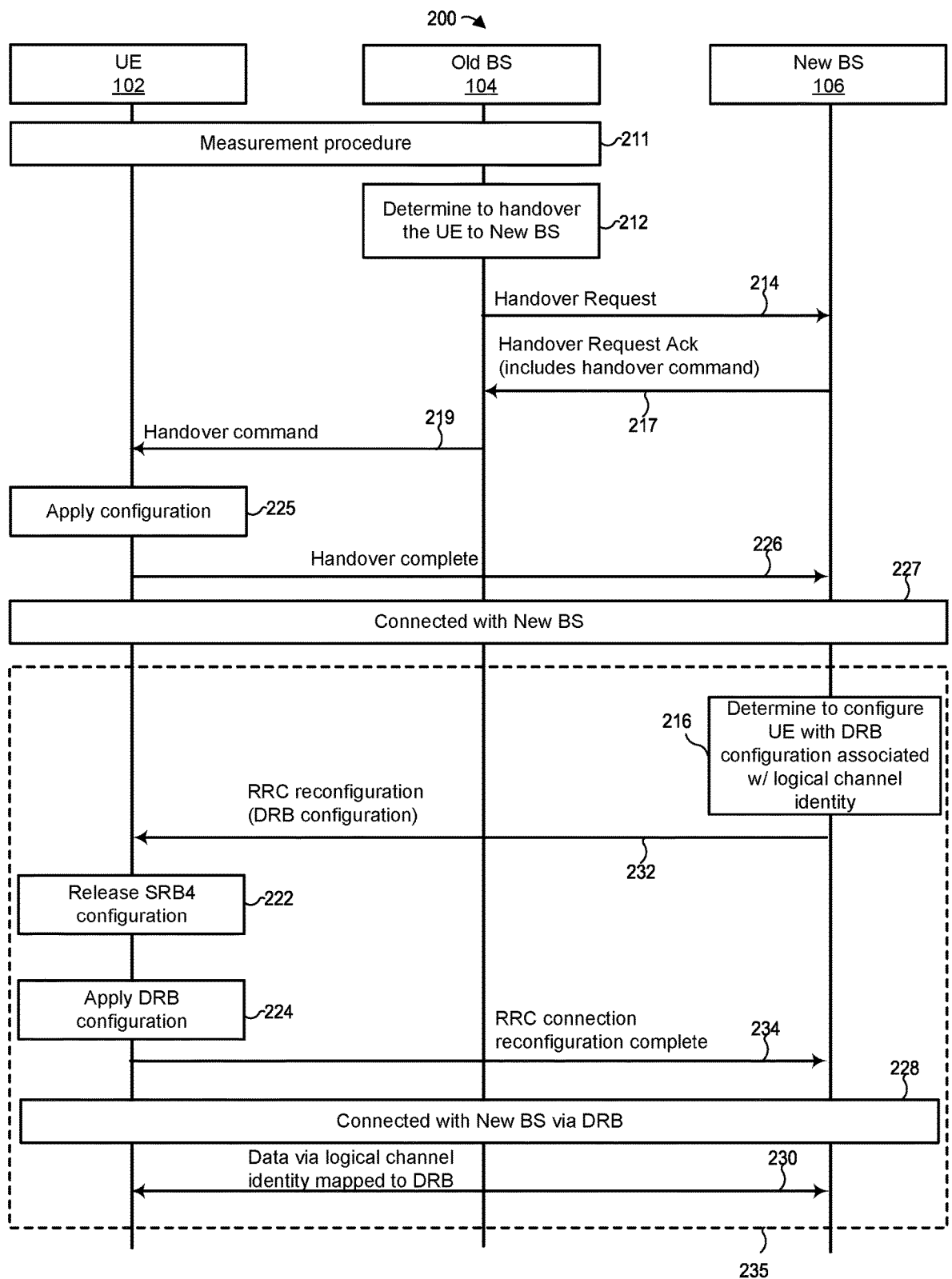
FIG. 2B illustrates an example message flow diagram of a handover scenario in which a base station determines to include a configuration for a DRB in a message associated with a handover procedure to release SRB4 after the handover scenario is complete, in accordance with the techniques of this disclosure.

Turning now to FIG. 2B, at the beginning of a scenario 200, UE 102 and base station 104 perform 211 the measurement procedure. After a period of time, base station 104 determines 212 to handover UE 102 to base station 106. Accordingly, base station 104 transmits 214 a Handover Request message to base station 106. In response, base station 106 determines to configure UE 102 with a configuration (e.g., a security configuration in contrast to a DRB configuration illustrated in FIG. 2A), includes the configuration in a Handover Command message (e.g., an RRCConnectionReconfiguration message, an RRCReconfiguration message), and subsequently transmits 217 a Handover Request Acknowledge message including the Handover Command message to base station 104. In turn, base station 104 transmits 219 the Handover Command message to UE 102.

The Handover Command message causes UE 102 to apply 225 the configuration included in the Handover Command message.

In turn, UE 102 transmits 226 a Handover Complete message (e.g., an RRCConnectionReconfigurationComplete message, an RRCReconfigurationComplete message) to base station 106, thereby successfully completing the handover scenario. Accordingly, UE 102 operates 227 in a connected state with base station 106.

In contrast to base station 106 illustrated in FIG. 2A, base station 106 illustrated in FIG. 2B initiates 235 a reconfiguration procedure, by determining 216 to configure UE 102 with a DRB configuration associated with the same logical channel identity value as the configured SRB4 after successful completion of the handover scenario, either because base station 106 does not support or is otherwise unaware of the configured SRB, or because base station 106 supports the configured SRB4 yet intends to release the configured SRB4 (i.e., hence the logical channel identity value that was assigned to the configured SRB4 is available for assignment by base station 106). Base station 106 includes the DRB configuration in a RRC Reconfiguration message, and subsequently transmits 232 the RRC Reconfiguration message to UE 102.

The RRC Reconfiguration message causes UE 102 to release 222 the SRB4 and apply 224 the DRB configuration included in the RRC Reconfiguration message. Accordingly, and advantageously, UE 102 validates the RRC Reconfiguration message because the logical channel identity value associated with the DRB configuration is only associated with the DRB configuration and not the SRB4 configuration. In some embodiments, UE 102 can also release the measurement configuration provided by base station 104 at event 211.

In turn, UE 102 transmits 234 an RRC Connection Reconfiguration Complete message (e.g., an RRCConnectionReconfiguration message or an RRCReconfiguration message) to base station 106. Accordingly, and as described above in FIG. 2A, UE 102 operates 228 in a connected state with base station 106, and therefore UE 102 and base station 106 can exchange 230 data via the logical channel identity mapped to the DRB, thereby completing 235 the reconfiguration procedure.

Figure 3:
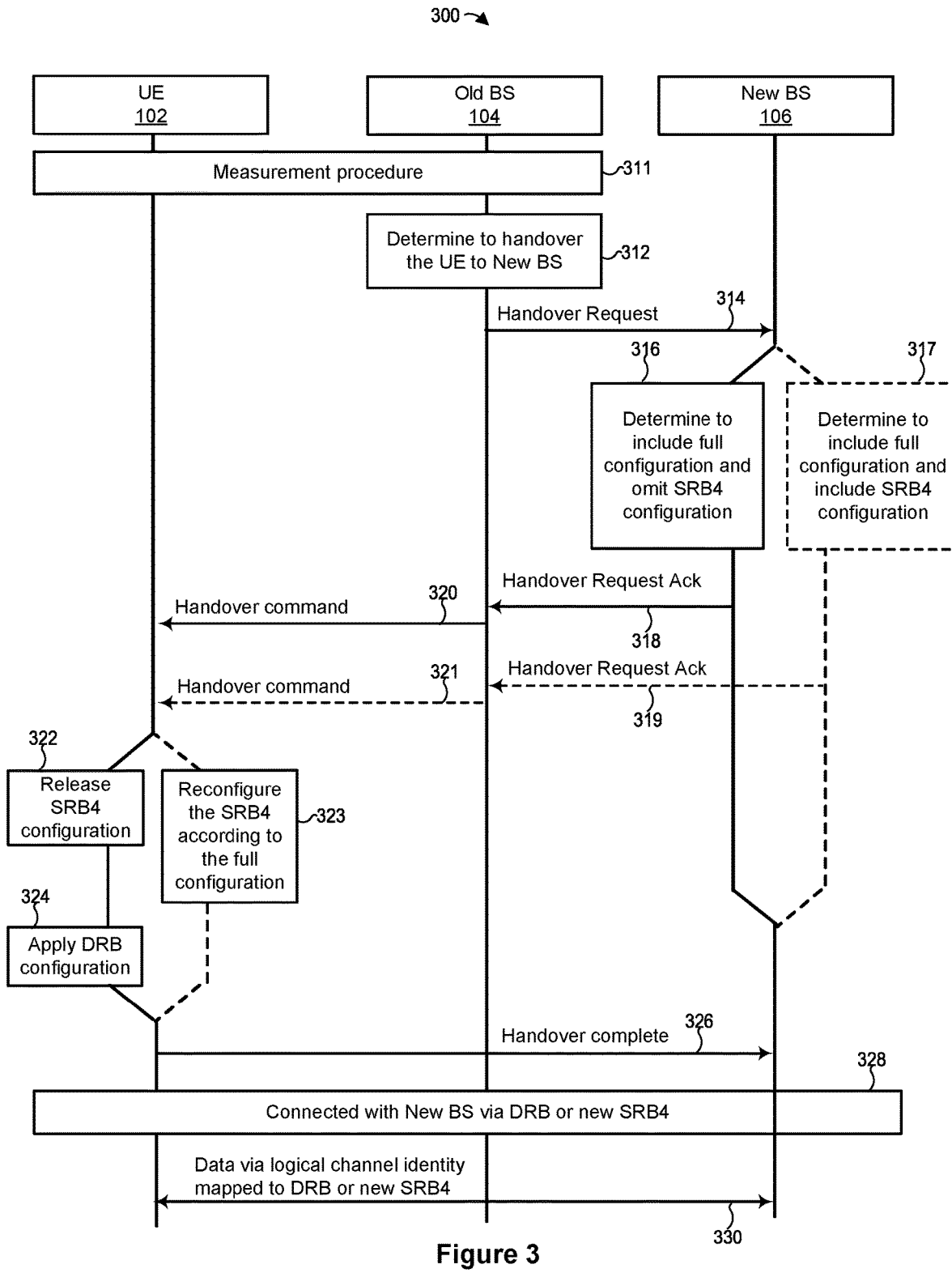
FIG. 3 illustrates an example message flow diagram of a handover scenario in which a base station determines to include a full configuration and either omit or include an SRB4 configuration in a message associated with a handover procedure to release or reconfigure SRB4, in accordance with the techniques of this disclosure.

Turning now to FIG. 3, at the beginning of a scenario 300, UE 102 and base station 104 perform 311 a measurement procedure, similar to event 211 discussed above. Also similar to events 212, 214 discussed above, base station 104 determines 312 to handover UE 102 to base station 106 and subsequently transmits 314 a Handover Request message to base station 106.

In some embodiments, in response to the Handover Request message, base station 106 determines 316 to configure UE 102 with a full configuration or delta configuration, which may include a DRB configuration (similar to event 216) and omit an SRB4 configuration. For example, base station 106 may determine to provide a full configuration or delta configuration when base station 106 does not recognize at least one configuration (e.g., an SRB4 configuration) associated with the connection between UE 102 and base station 104, or when base station 106 determines to conserve processing resources by not filtering through the configuration(s) associated with the connection between UE 102 and base station 104. As another example, base station 106 may simply be operated by a different vendor than that of base station 104.

The base station 106 includes a full configuration or delta configuration and omits an SRB4 configuration in a Handover Command message, and subsequently transmits 318 a Handover Request Acknowledge message including the Handover Command message to base station 104, which in turn transmits 320 the Handover Command message to UE 102, similar to events 218 and 220.

Similar to events 222 and 224, the Handover Command message causes UE 102 to release 322 the SRB4 and apply 324 the DRB configuration indicated in the Handover Command message. Accordingly, and advantageously, UE 102 validates the Handover Command message because the logical channel identity value associated with the DRB configuration is only associated with the DRB configuration and not the SRB4 configuration. In some embodiments, UE 102 can also release the measurement configuration provided by base station 104 at event 311.

In other embodiments, in response to the Handover Request message, base station 106 determines 317 to include the full configuration or delta configuration and include the SRB4 configuration in a Handover Command message, and subsequently transmits 319 a Handover Request Acknowledge message including the Handover Command message to base station 104, which in turn transmits 321 the Handover Command message to UE 102, similar to events 218 and 220. However, in contrast to events 322 and 324, the Handover Command message causes UE 102 to reconfigure 323 the SRB4 in view of the SRB4 configuration indicated in the Handover Command message. It should be noted that UE 102 may reconfigure the existing SRB4 maintained by base station 104 into the new SRB4 configuration provided by base station 106, or release the existing SRB4 and apply the new SRB4 configuration provided by the base station 106, and optionally keep the previous SRB4 configuration as-is, in addition to the new SRB4 configuration. Accordingly, and advantageously, because both UE 102 and base station 106 are configured to communicate via the new SRB4, UE 102 is able to communicate with base station 106 via the new SRB.

In response to either applying 324 the DRB configuration or reconfiguring 323 the SRB, UE 102 transmits 326 a Handover Complete message to base station 106, similar to event 226. Accordingly, UE 102 operates 328 in a connected state with base station 106 via the DRB or the new SRB, and therefore UE 102 and base station 106 can communicate via the DRB or the new SRB.

Figure 4:
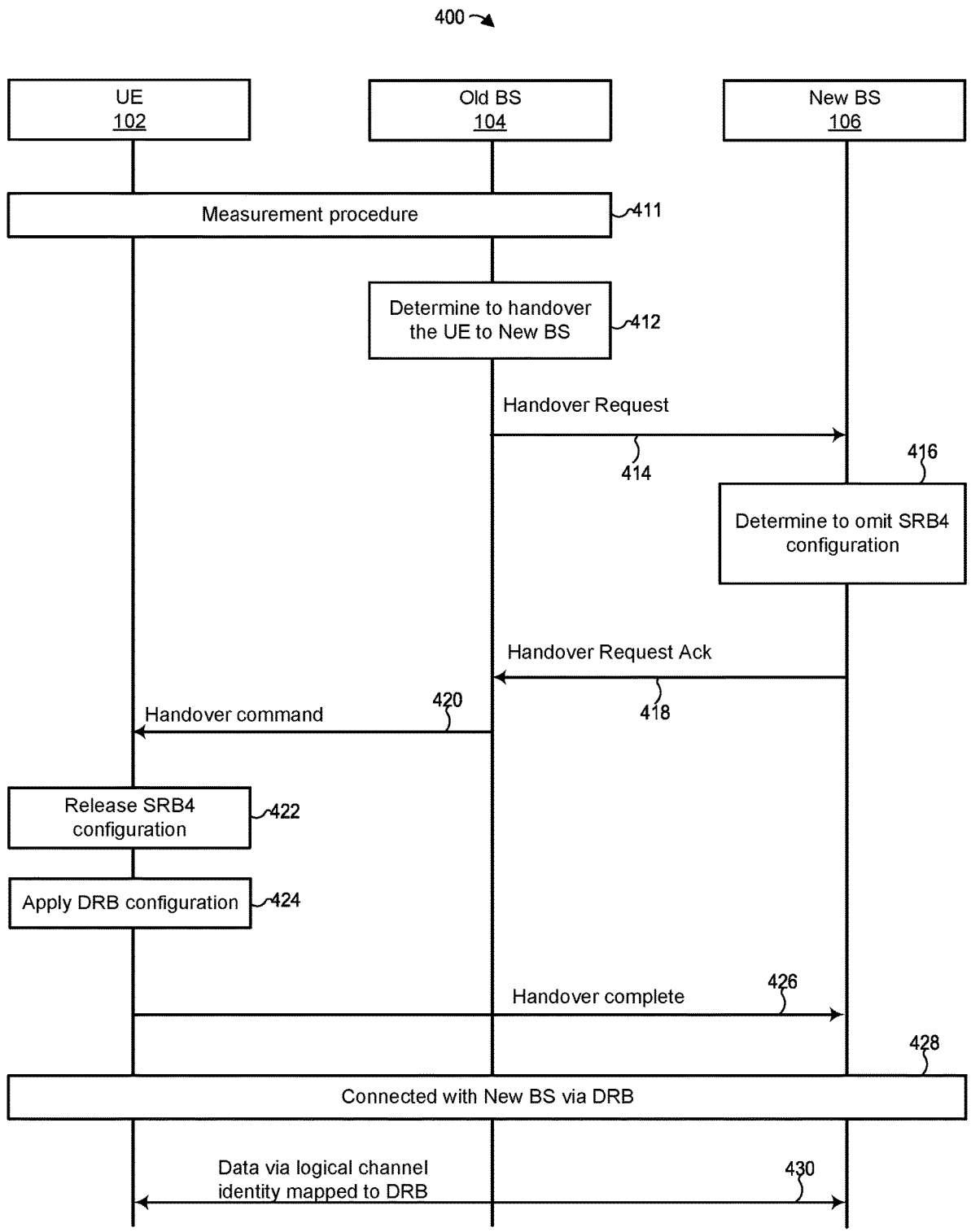
FIG. 4 illustrates an example message flow diagram of a handover scenario in which a base station determines to omit an SRB4 configuration in a message associated with a handover procedure to release SRB4, in accordance with the techniques of this disclosure.

Turning now to FIG. 4, at the beginning of a scenario 400, UE 102 and base station 104 perform 411 a measurement procedure, similar to event 211 discussed above. Similar to event 212 discussed above, base station 104 determines 412 to handover UE 102 to base station 106. Base station 104 includes the SRB4 configuration in a Handover Request message, and subsequently transmits 414 the Handover Request message to base station 106, similar to event 214.

In response to the Handover Request message, base station 106, which does not support SRB4 in scenario 400, determines 416 to omit the SRB4 configuration and include a DRB configuration for UE 102. Base station 106 omits an SRB4 configuration and includes a configuration for a DRB in a Handover Command message, and subsequently transmits 418 a Handover Request Acknowledge message including the Handover Command message to base station 104, similar to event 218. In turn, base station 104 transmits 420 the Handover Command message to UE 102, similar to event 220.

In response, UE 102 and base station 106 proceed to events 422, 424, 426, 428, and 430, similar to events 222, 224, 226, 228, and 230.

Figure 5:
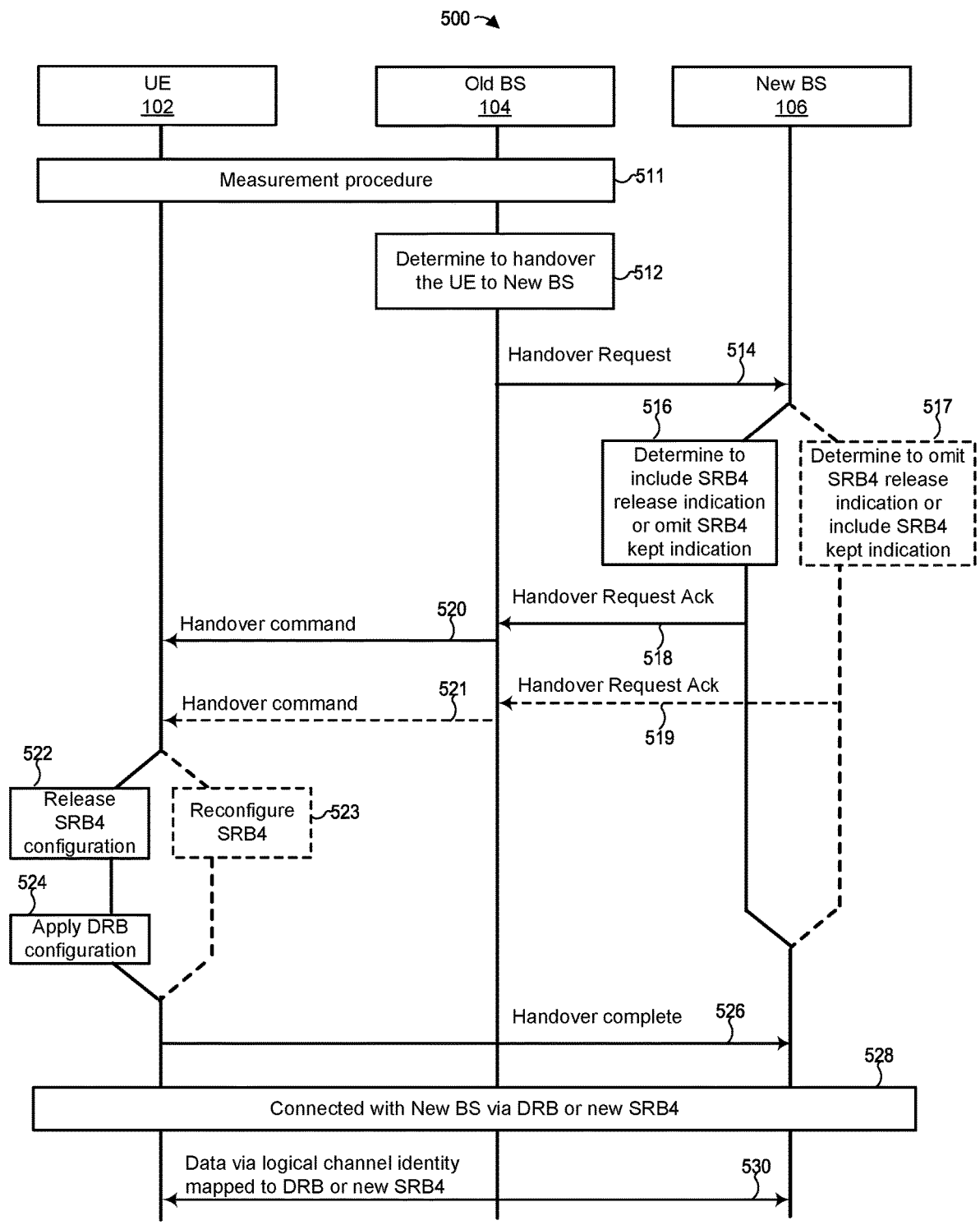
FIG. 5 illustrates an example message flow diagram of a handover scenario in which a base station determines to either include or omit an explicit indicator in a message associated with a handover procedure to release or reconfigure SRB4, in accordance with the techniques of this disclosure.

Turning now to FIG. 5, at the beginning of a scenario 500, UE 102 and base station 104 perform 511 a measurement procedure, similar to event 211 discussed above. Also similar to events 212, 214 discussed above, base station 104 determines 512 to handover UE 102 to base station 106 and subsequently transmits 514 a Handover Request message to base station 106.

In some embodiments, in response to the Handover Request message, base station 106 determines 516 to provide an SRB4 release indication or omit an SRB4 kept indication for UE 102. Base station 106 includes an SRB4 release indication and omits an SRB4 kept indication in a dedicated field of a Handover Command message, and subsequently transmits 518 a Handover Request Acknowledge message including the Handover Command message to base station 104, which in turn transmits 520 the Handover Command message to UE 102, similar to events 218 and 220. In response, UE 102 and base station 106 proceed to events 522, 524, 526, 528, and 530, similar to events 222, 224, 226, 328, and 330.

Although not illustrated, base station 104 instead of base station 106 may determine to provide the SRB4 release indication or omit the SRB4 kept indication for UE 102. As such, base station 104 includes an SRB4 release indication and omits an SRB4 kept indication in the Handover Command message, and subsequently transmits the Handover Command message to UE 102. Accordingly, because base station 106 communicates with UE 102 via base station 104, base station 104 modifies the Handover Command message the base station 106 transmits to UE 102.

In other embodiments, in response to the Handover Request message, base station 106 determines 517 to omit the SRB4 release indication and include the SRB4 kept indication in a Handover Command message, and subsequently transmits 519 a Handover Request Acknowledge message including the Handover Command message to base station 104, which in turn transmits 521 the Handover Command message to UE 102, similar to events 218 and 220. In response, UE 102 and base station 106 proceed to events 523, 526, 528, and 530, similar to events 323, 226, 328, and 330.

Figure 6:
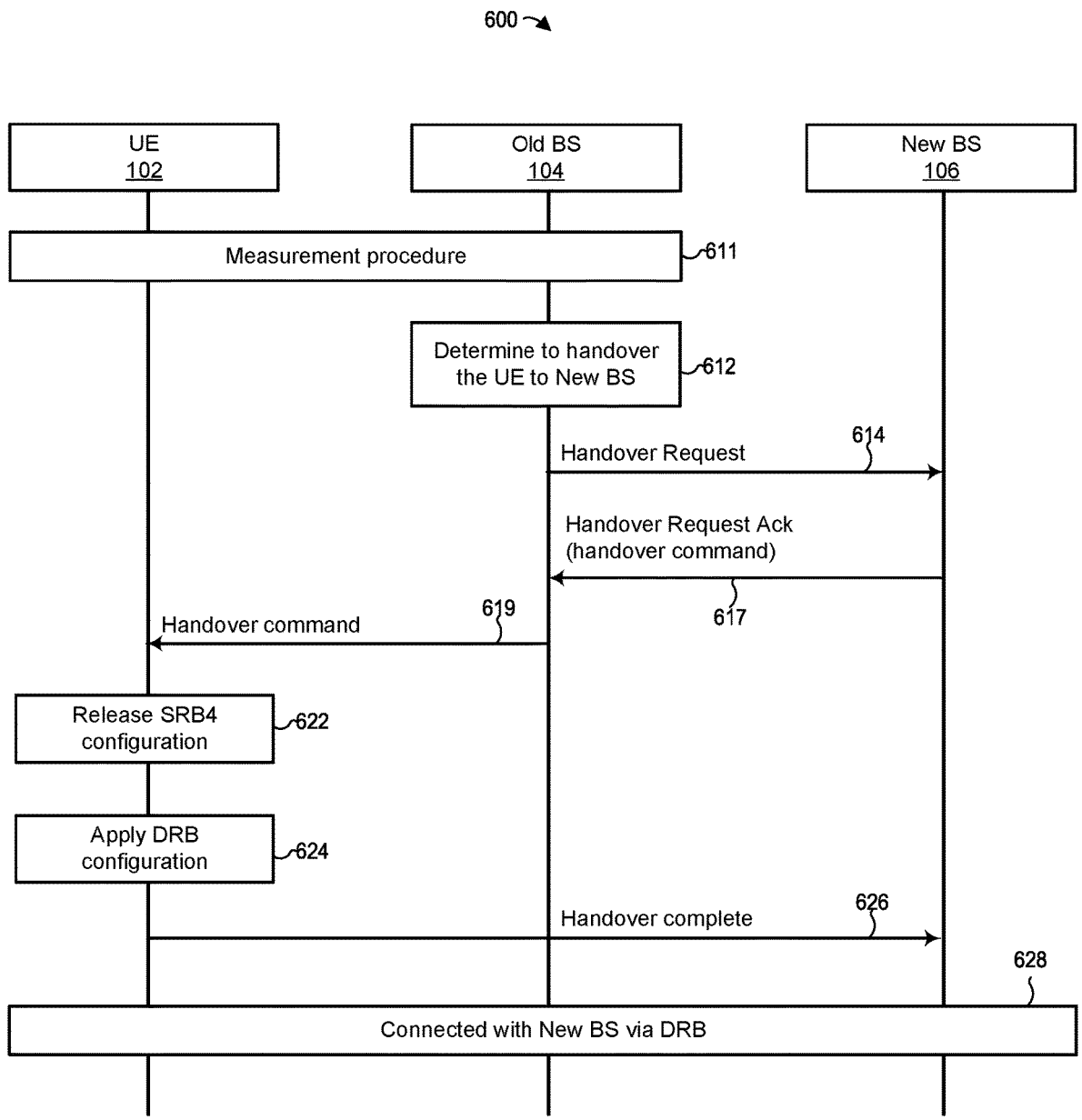
FIG. 6 illustrates an example message flow diagram of a handover scenario in a UE automatically releases SRB4 in view of a handover procedure, in accordance with the techniques of this disclosure.

Turning now to FIG. 6, at the beginning of a scenario 600, UE 102 and base stations 104, 106 proceed to events 611, 612, 614, 617, and 619, similar to events 211, 212, 214, 218, and 220. In response to receiving 619 the Handover Command message, UE 102 proceeds to events 622, 624, 626, and 628, similar to events 222, 224, 226, and 228. As such, UE 102 releases SRB4 automatically in response to the Handover Command message or after the handover scenario is complete. For example, in embodiments in which the RATs of base station 104 and base station 106 are different, UE 102 releases SRB4 automatically due to inter-RAT handover from base station 104 to base station 106.

Figure 7A:
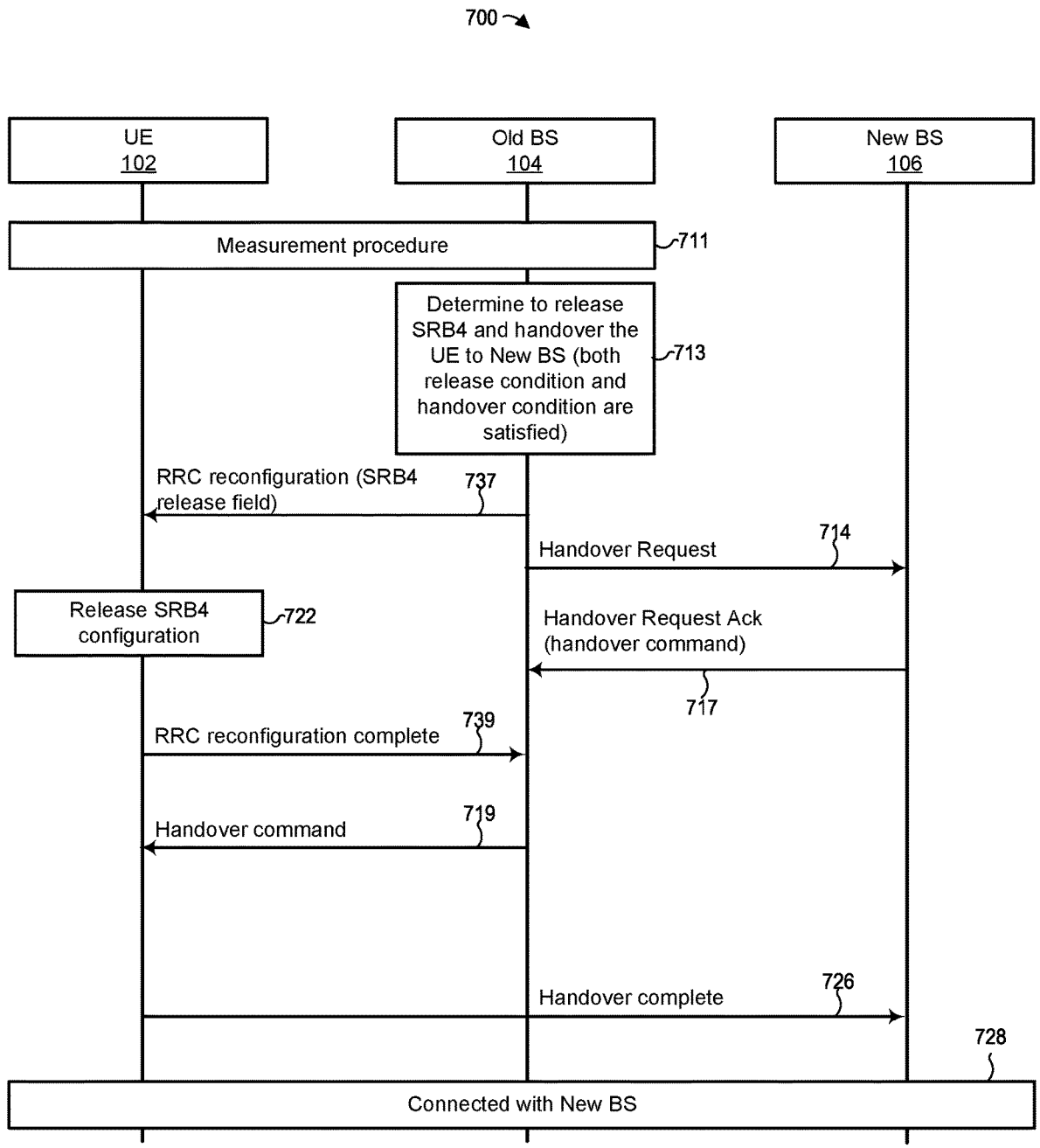
FIG. 7A illustrates an example message flow diagram of a handover scenario in which a base station determines to include an explicit indicator in a message associated with a handover procedure to release SRB4 when an SRB4 release condition and a handover condition are satisfied, in accordance with the techniques of this disclosure.

Turning now to FIG. 7A, at the beginning of a scenario 700, UE 102 and base station 104 perform 711 the measurement procedure, similar to event 211. After a period of time, base station 104 may determine 713 to not only handover UE 102 to base station 106, but also release SRB4. In other words, base station 104 may determine to handover UE 102 to base station 106 and release SRB4 if an SRB4 release condition is the same as a handover condition. For example, when base station 104 receives an indication that a measurement result for cell 124 or 126 at the UE 102 satisfies a certain threshold (e.g., a fixed threshold, an offset value), base station 104 determines that the measurement result satisfies the handover condition as well as the SRB4 release condition, and subsequently sends 737 the RRC reconfiguration message (e.g., an RRCConnectionReconfiguration message or an RRCReconfiguration message) to UE 102, to cause UE 102 to release 722 the SRB4. Base station 104 may include a dedicated field (e.g., a SRB4 release indicator, a srb-ToReleaseListExt-r15 or a SRB4 configuration) in the RRC Reconfiguration message to cause UE 102 to release SRB4. Subsequently, base station 104 sends 714 the Handover Request message to base station 106.

In one implementation, the measurement result indicates signal strength or quality for cell 126 satisfies a threshold. For example, the measurement result may include an event identity indicating an event. The event can be Event A3 (indicating a neighbor cell becomes better than a serving cell (e.g., primary cell (PCell), primary SCell (PSCell)) by an offset), Event A4 (indicating a neighbor cell becomes better than a threshold), or Event A5 (a serving cell becomes worse than a first threshold and a neighbor cell becomes better than a second threshold). In another example, the measurement result may include a value of the signal strength or quality for cell 126 (e.g., reference signal received power (RSRP), reference signal received quality (RSRQ) or signal to noise and interference ratio (SINR)). In response to determining that the measurement result indicating cell 126 signal strength or quality satisfies a threshold, the base station 104 decides to hand over UE 102 to base station 106. In response to the handover decision, the base station 104 decides to release the SRB4 configuration before handing over UE 102 to base station 106. In some implementations, the offset and/or threshold may be predetermined by base station 104. In some implementations, base station 104 may transmit the offset and/or threshold to UE 102.

In another implementation, the measurement result indicates signal strength or quality for cell 124 does not satisfy a threshold. For example, the measurement result may include an event identity indicating an event. The event can be Event A2 (indicating a serving cell becomes worse than a threshold). In another example, the measurement result may include a value of the signal strength or quality for cell 124 (e.g., RSRP, RSRQ or SINR). In response to determining that the measurement result indicating signal strength or quality for cell 124 does not satisfy the threshold, base station 104 decides to release the SRB4 and hand over UE 102 to base station 106 (i.e., always release SRB4 upon handover). In some implementations, the threshold may be predetermined by base station 104. In some implementations, base station 104 may transmit the threshold to UE 102.

In other implementations, base station 104 can determine that it should release the SRB4 if the SRB4 release condition is similar but not identical to the handover condition. For example, with reference to FIG. 7B, when base station 104 receives an indication that a measurement result for cell 124 at the UE 102 satisfies a first predetermined threshold but does not satisfy a second predetermined threshold, the base station 104 determines 715 that the measurement result satisfies the SRB4 release condition but does not satisfy the handover condition. Base station 104 in this scenario sends 737 the RRC reconfiguration message to UE 102. If the base station 104 subsequently determines 716 that the measurement result satisfies the second predetermined threshold, the base station 104 determines that the measurement result now satisfies the handover condition, and subsequently sends 714 the Handover Request message to base station 106.

In one implementation, base station 104 receives a first measurement result indicating that signal strength or quality for cell 124 is below the first predetermined threshold and not yet below the second predetermined threshold. Based on the first measurement result, base station 104 determines that UE 102 may be leaving coverage of base station 104. In response to the determination, base station 104 decides to release the SRB4 configuration. Subsequently, base station 104 receives a second measurement result indicating that signal strength or quality for cell 124 is below the second predetermined threshold. Based on the second measurement result, base station 104 decides to hand over UE 102 to base station 106. For example, the first measurement result may include a first event identity indicating a first event. The first event can be Event A2 (indicating a serving cell becomes worse than the first predetermined threshold). The second measurement result may include a second event identity indicating a second event. The second event can be Event A2 (indicating a serving cell becomes worse than the second predetermined threshold). In some implementations, base station 104 may transmit the first predetermined threshold and/or the second predetermined threshold to UE 102.

In another implementation, base station 104 receives a first measurement result indicating that signal strength or quality for cell 124 does not satisfy the first predetermined threshold. Based on the first measurement result, base station 104 determines that UE 102 may be leaving coverage of base station 104. In response to the determination, base station 104 decides to release the SRB4 configuration. Subsequently, base station 104 receives a second measurement result indicating that signal strength or quality for cell 126 is above the second predetermined threshold. Based on the second measurement result, base station 104 decides to hand over UE 102 to base station 106. For example, the first measurement result may include a first event identity indicating a first event. The first event can be Event A2 (indicating a serving cell becomes worse than the first predetermined threshold). The second measurement result may include a second event identity indicating a second event. The second event can be Event A2 (indicating a serving cell becomes worse than the second predetermined threshold). In some implementations, base station 104 may transmit the first predetermined threshold and/or the second predetermined threshold to UE 102.

Figure 7B:
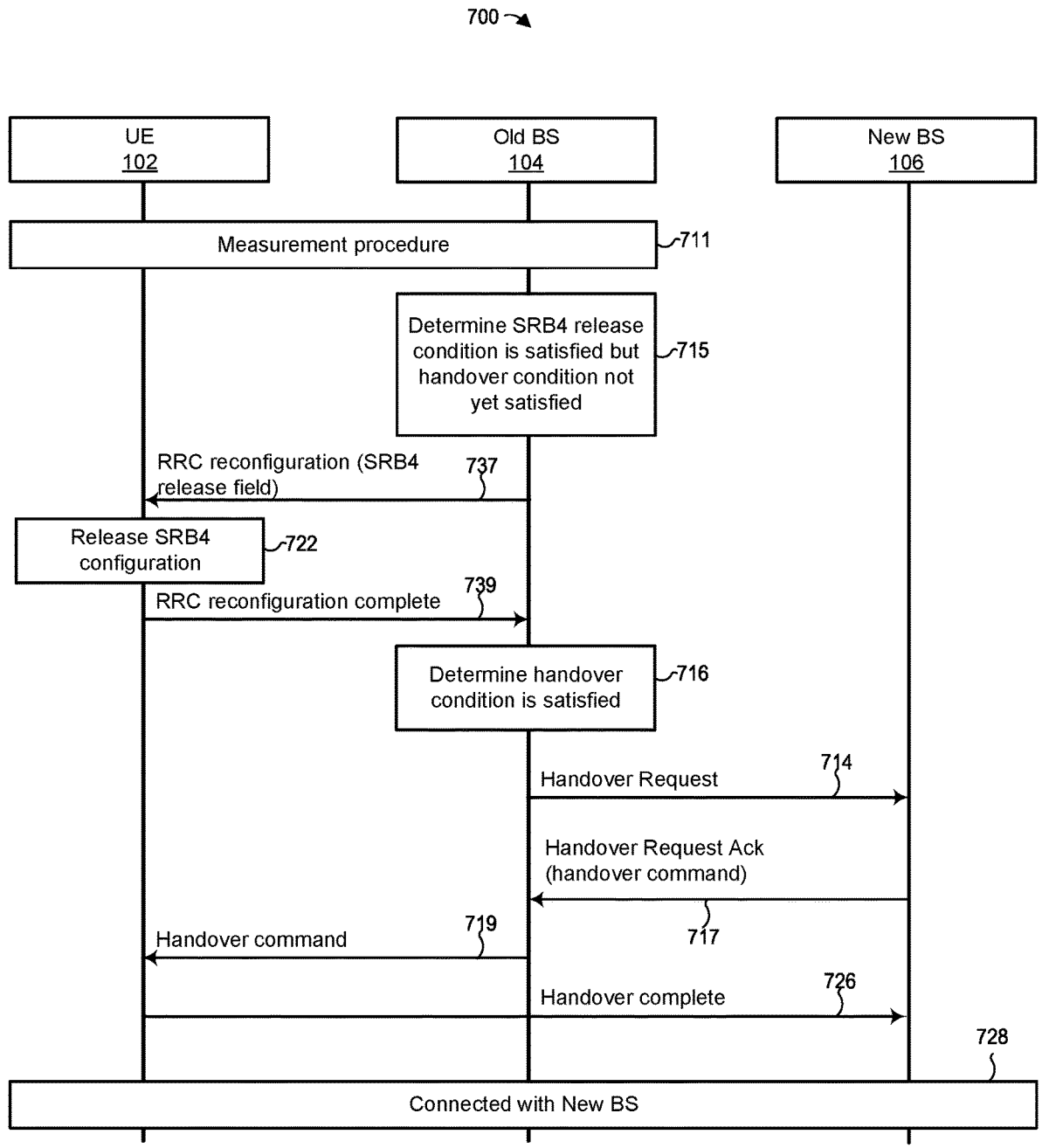
FIG. 7B illustrates an example message flow diagram of a handover scenario in which a base station determines to include an explicit indicator in a message associated with a handover procedure to release SRB4 when an SRB4 release condition is satisfied before a handover condition is satisfied, in accordance with the techniques of this disclosure.

As such, base station 104 in scenarios illustrated in FIGS. 7A and 7B may determine to release the SRB4 based on measurement results indicating signal strength or quality for cell 124 or cell 126. In releasing the SRB4, base station 104 prevents radio bearer non-capability issues that may result when base station 106 does not recognize at least one configuration (e.g., an SRB4 configuration) associated with the connection between UE 102 and base station 104. As another example, base station 104 may release SRB4 because base station 106 is operated by a different vendor than that of base station 104.

In some implementations, base station 104 transmits 714 a Handover Request message to base station 106 after transmitting 737 the RRC Reconfiguration message to UE 102. In other implementations, base station 104 transmits 714 the Handover Request message to base station 106 before transmitting 737 the RRC Reconfiguration message to UE 102. In yet other implementations, base station 104 transmits the Handover Request message to base station 106 and the RRC Reconfiguration message to UE 102 at the same time.

In response to the Handover Request message, base station 106 may transmit 717 a Handover Request Acknowledge message to base station 104.

In response to receiving 737 the RRC Reconfiguration message, UE 102 transmits 739 an RRC Reconfiguration Complete message (e.g., an RRCConnectionReconfigurationComplete message, an RRCReconfigurationComplete message) to base station 104, thereby completing the SRB4 release. Base station 104 may receive the RRC Reconfiguration Complete message from UE 102 before receiving the Handover Request Acknowledge message (which includes a Handover Command message) from base station 106 (i.e., as illustrated in the scenario of FIG. 7B), after receiving the Handover Request Acknowledge message from base station 106 (not illustrated in FIG. 7B), depending on the relative completion timing at UE 102 and base station 106, or after receiving the Handover Request Acknowledge message from base station 106 (i.e., as illustrated in the scenario of FIG. 7A).

Base station 104 transmits 719 the Handover Command message to UE 102 in response to receiving the RRC Reconfiguration Complete message (i.e., as illustrated in the scenario of FIG. 7A), before receiving the RRC Reconfiguration Complete message (not illustrated in FIG. 7A), or after receiving the RRC Reconfiguration Complete message (i.e., as illustrated in the scenario of FIG. 7B).

In response to receiving 719 the Handover Command message, UE 102 transmits 726 a Handover Complete message (e.g., an RRCConnectionReconfigurationComplete message, an RRCReconfigurationComplete message) to base station 106, thereby completing the handover scenario. Accordingly, UE 102 operates 728 in a connected state with base station 106.

Because base station 104 causes UE 102 to release SRB4, which base station 106 may not support, base station 106 avoids providing a configuration to UE 102 that could have conflicted with the released SRB4. That is, if base station 106 determines to configure UE 102 with a DRB configuration or a new SRB4 configuration (included in the Handover Command message, or separately in an RRC Reconfiguration message, similar to event 232) associated with the same logical channel identity value as the released configured SRB4, UE 102 validates the Handover Command message or the RRC Reconfiguration message because the logical channel identity value associated with the DRB configuration or new SRB4 configuration is not associated with the released SRB4 configuration.

Figure 8:
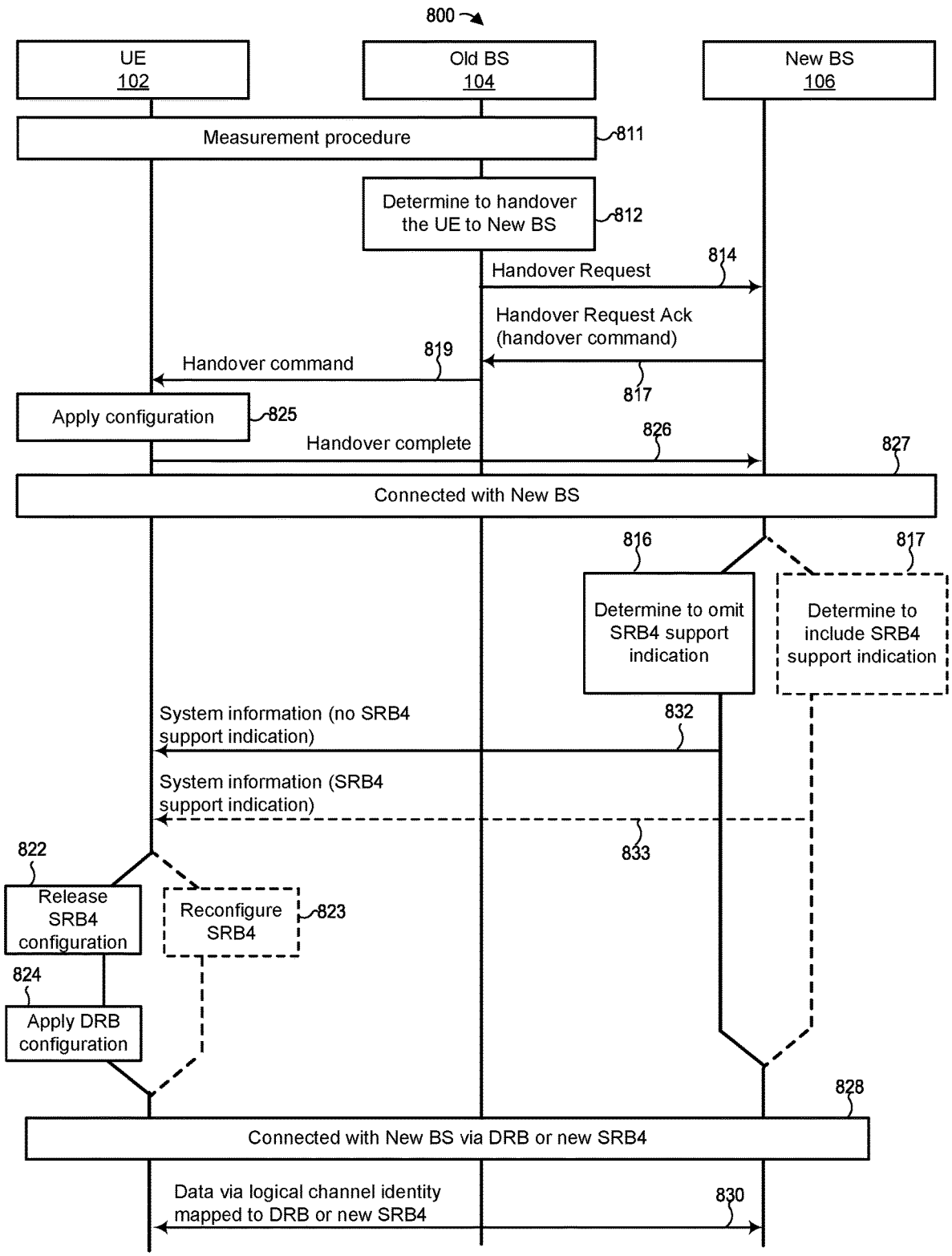
FIG. 8 illustrates an example message flow diagram of a handover scenario in which a base station determines to omit or include an explicit indicator when broadcasting system information to release or reconfigure SRB4, in accordance with the techniques of this disclosure.

Turning now to FIG. 8, at the beginning of a scenario 800, UE 102 and base stations 104, 106 proceed to events 811, 812, 814, 817, 819, 825, 826, and 827, similar to events 211, 212, 214, 217, 219, 225, 226, and 227.

After successful completion of the handover scenario, base station 106 determines 816 to omit an SRB4 support for UE 102 in some embodiments. Base station 106 omits an SRB4 support indication when broadcasting 832 system information to UE 102 and other UEs in the wireless communication system 100. In response, UE 102 and base station 106 proceed to events 822, 824, 828, and 830, similar to events 222, 224, 328, and 330.

In other embodiments, in response to the Handover Request message, base station 106 determines 817 to include the SRB4 support indication for UE 102. Base station 106 includes an SRB4 support indication when broadcasting 833 system information to UE 102 and other UEs in the wireless communication system 100. In response, UE 102 and base station 106 proceed to events 823, 828, and 830, similar to events 323, 328, and 330.

Although base station 104 is illustrated as transmitting a Handover Request (events 214, 214, 314, 414, 514, 614, 714) and receiving a Handover Request Acknowledge message (events 218, 217, 318, 418, 518, 617, 717) in FIGS. 2A-2B and 3-8, base station 104 may alternatively transmit a Handover Required message and receive a Handover Confirm message. Specifically, base station 104 may transmit a Handover Required message to CN 110 (e.g., Access Management Function (AMF) and/or Mobility Management Entity (MME)) instead of sending the Handover Request message to base station 106. In response, CN 110 may send a Handover Request message to base station 106, which in turn may include the Handover Command message in a Handover Request Acknowledge message and send the Handover Request Acknowledge message to CN 110. CN 110 in turn may include the Handover Command message in a Handover Confirm message and send the Handover Confirm message to base station 104.

FIGS. 9-13 generally illustrate example message flow diagrams of the re-establishment scenario between UE 102 and base stations 104, 106 of wireless communication system 100.

Figure 9:
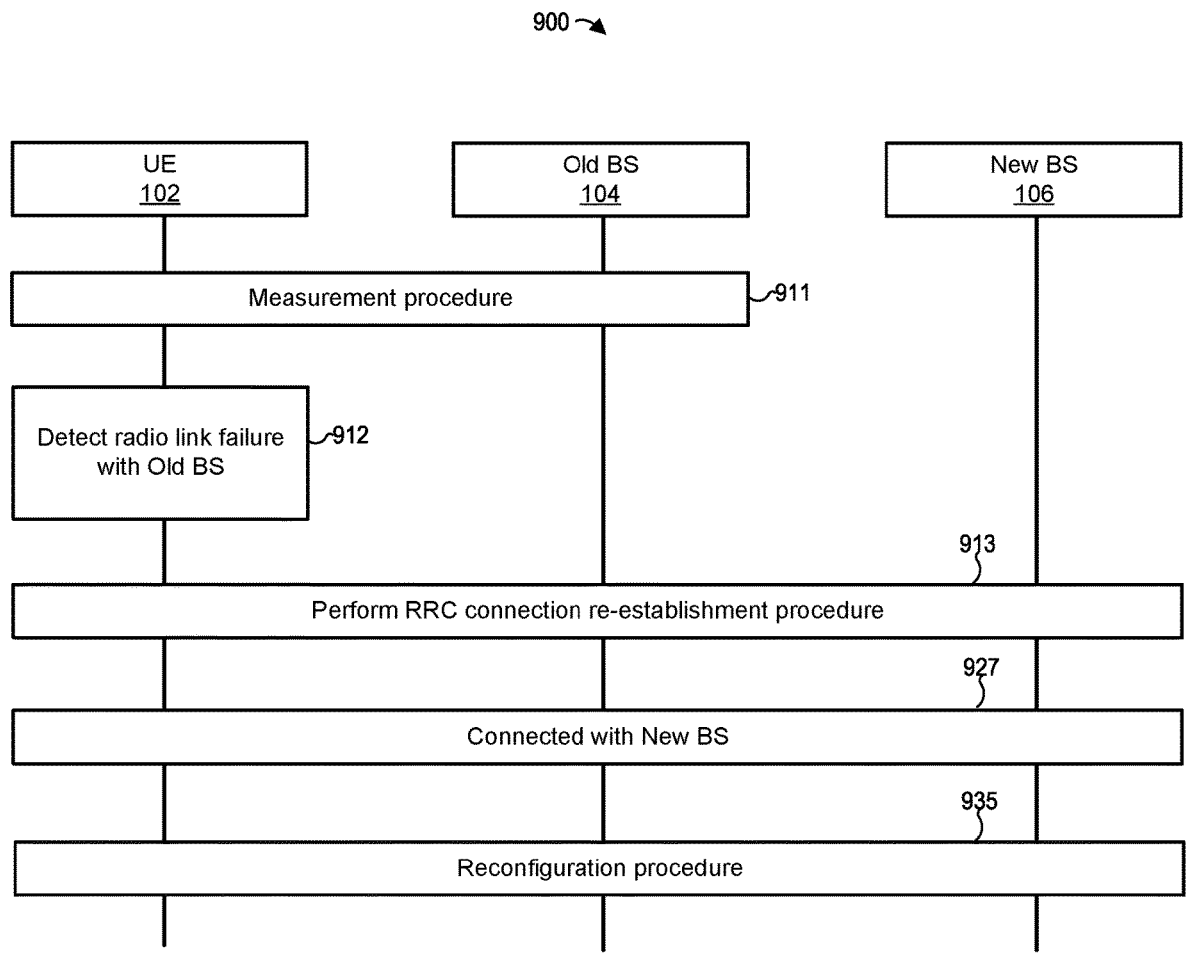
FIG. 9 illustrates an example message flow diagram of a re-establishment scenario in which a base station determines to include a configuration for a DRB in a message associated with a procedure for re-establishing a radio connection to release SRB4, in accordance with the techniques of this disclosure.

Turning now to FIG. 9, at the beginning of a scenario 900, UE 102 and base station 104 perform 911 a measurement procedure, similar to event 211 discussed above.

After a period of time, UE 102 detects 912 radio link failure (RLF) over the established connection with the base station 104, or other failure (e.g., failure of a handover procedure between base stations 104, 106, failure to reconfigure SRB4), by receiving a message from either base station 104 or base station 106. After detecting failure, UE 102 subsequently selects base station 106 for servicing by performing 913 an RRC connection re-establishment procedure with base station 106. Base station 106 does not support SRB4 in scenario 900. After performing the RRC connection re-establishment procedure successfully, UE 102 operates 927 in a connected state with base station 106. Subsequently, base station 106 performs 935 a reconfiguration procedure, similar to event 235, and therefore causes UE 102 to release a previously configured SRB4 maintained by base station 104 and apply a DRB configuration provided by base station 106. Accordingly, UE 102 operates in a connected state with base station 106, and therefore UE 102 and base station 106 can exchange data via the logical channel identity mapped to the DRB.

In some embodiments, base station 106 may perform 935 the reconfiguration procedure before UE 102 completes 913 the RRC connection re-establishment procedure (i.e., base station 106 transmits an RRC reconfiguration message to UE 102 after transmitting the RRC connection reestablishment message to UE 102 and before receiving the RRC connection reestablishment complete message from UE 102).

Figure 10:
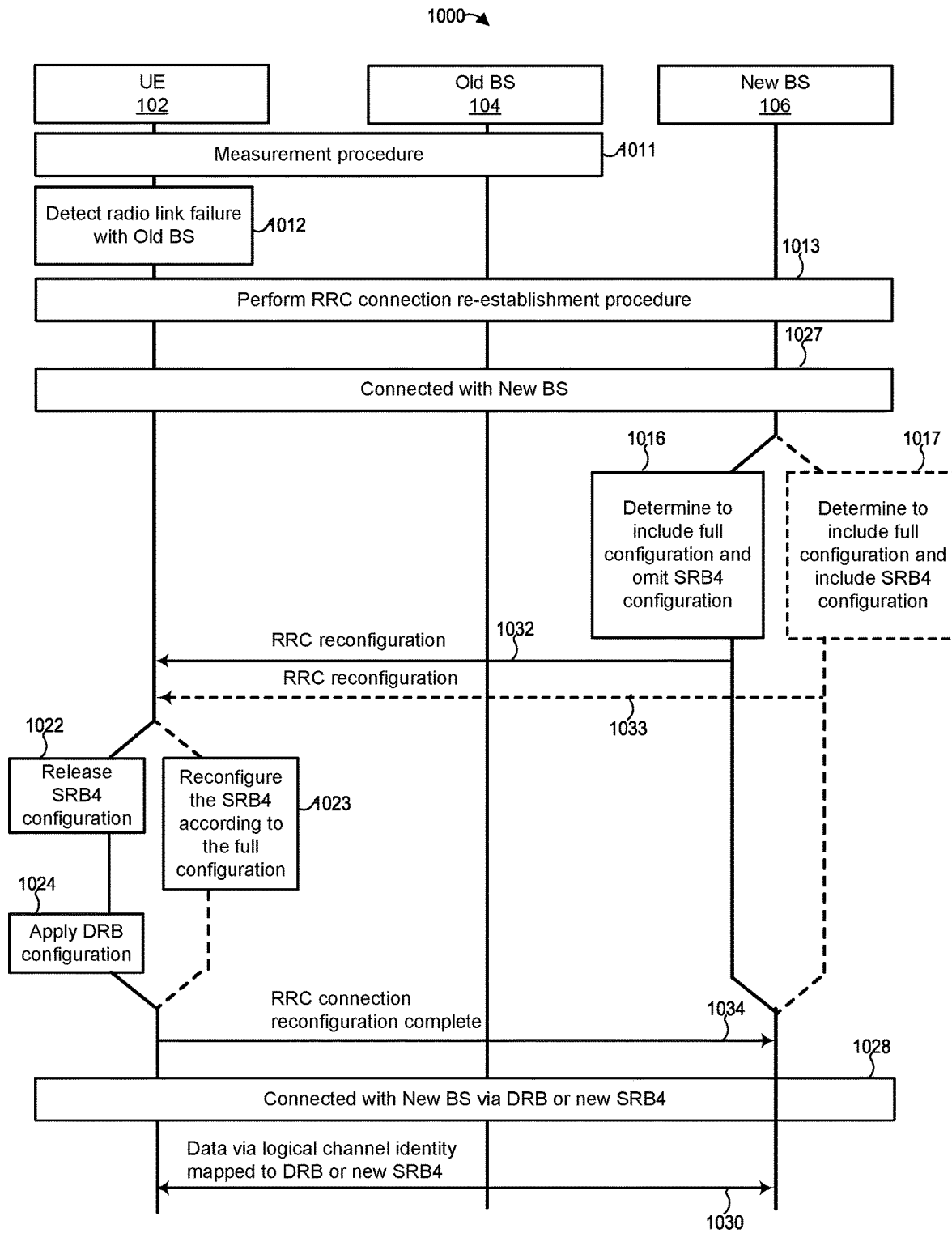
FIG. 10 illustrates an example message flow diagram of a re-establishment scenario in which a base station determines to include a full configuration and either omit or include an SRB4 configuration in a message associated with a procedure for re-establishing a radio connection to release or reconfigure SRB4, in accordance with the techniques of this disclosure.

Turning now to FIG. 10, at the beginning of a scenario 1000, UE 102 and base stations 104, 106 proceed to events 1011, 1012, 1013, and 1027, similar to events 911, 912, 913, and 927.

In some embodiments, base station 106 proceeds to event 1016, similar to event 316, and subsequently transmits 1032 an RRC Reconfiguration message including a full configuration or delta configuration and omitting an SRB4 configuration to UE 102, similar to event 232. In response, UE 102 proceeds to events 1022 and 1024, similar to events 322, 324.

In other embodiments, base station 106 proceeds to event 1017, similar to event 317, and subsequently transmits 1033 an RRC Reconfiguration message including a full configuration or delta configuration and including an SRB4 configuration to UE 102, similar to event 232. In response, UE 102 proceeds to event 1023, similar to event 323.

In response to either applying 1024 the DRB configuration or reconfiguring 1023 the SRB, UE 102 transmits 1034 an RRC connection reconfiguration complete to base station 106, similar to event 234. Accordingly, UE 102 operates 1028 in a connected state with base station 106 via the DRB or the SRB, and therefore UE 102 and base station 106 can communicate 1030 via the DRB or the SRB, similar to events 328 and 330.

Figure 11:
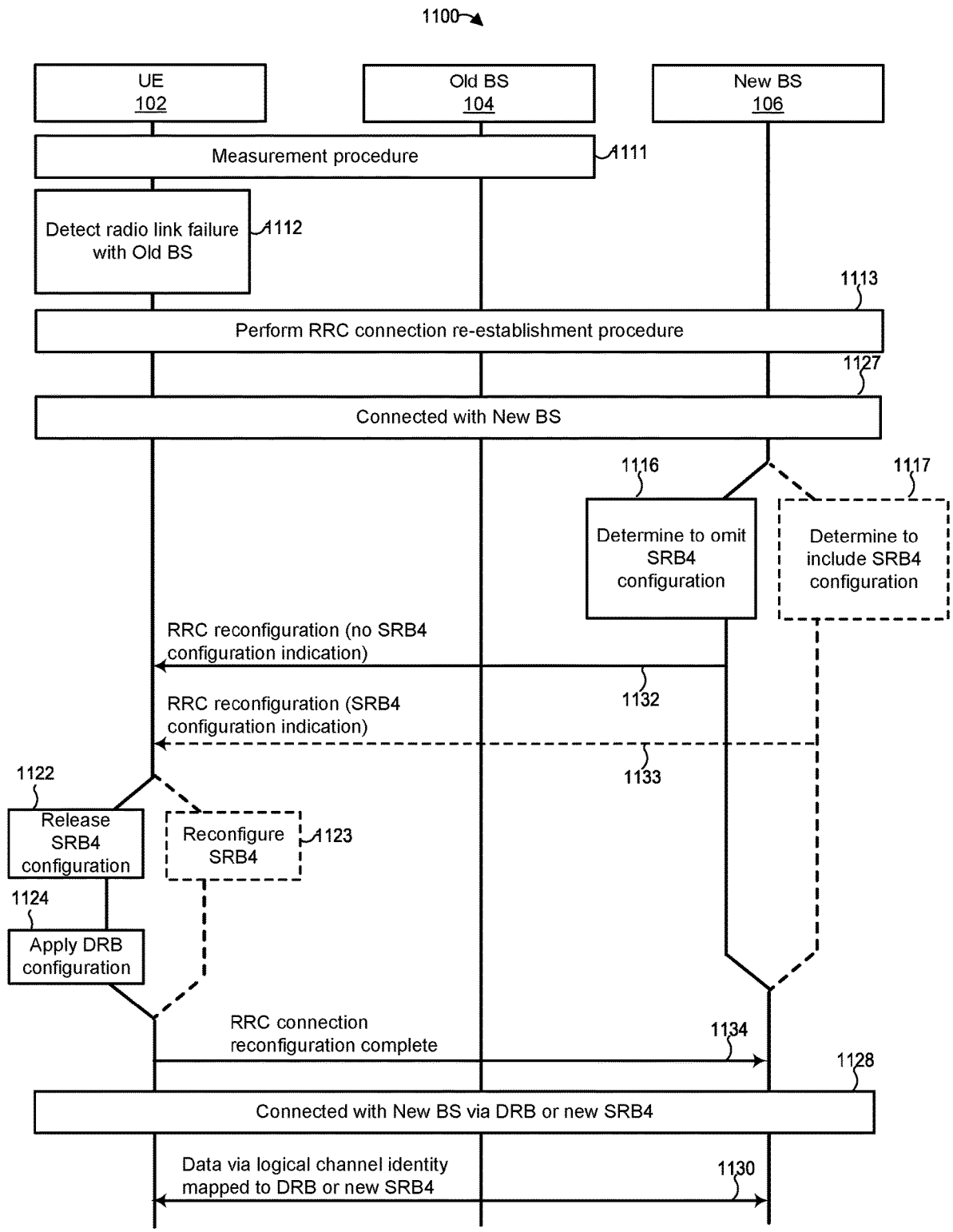
FIG. 11 illustrates an example message flow diagram of a re-establishment scenario in which a base station determines to omit or include an SRB4 configuration in a message associated with a procedure for re-establishing a radio connection to release or reconfigure SRB4, in accordance with the techniques of this disclosure.

Turning now to FIG. 11, at the beginning of a scenario 1100, UE 102 and base stations 104, 106 proceed to events 1111, 1112, 1113, and 1127, similar to events 911, 912, 913, and 927.

In some embodiments, base station 106 proceeds to event 1116, similar to event 416, and subsequently transmits 1132 an RRC Reconfiguration message omitting an SRB4 configuration indication to UE 102, similar to event 232. In response, UE 102 proceeds to events 1122 and 1124, similar to events 422 and 424.

In other embodiments, base station 106 determines 1117 to include the SRB4 configuration for UE 102. Base station 106 includes an SRB4 configuration in an RRC Reconfiguration message, and subsequently transmits 1133 the RRC Reconfiguration message to UE 102, similar to event 232. In response, UE 102 reconfigures 1123 the SRB4.

In response to either applying 1124 the DRB configuration or reconfiguring 1123 the SRB, UE 102 transmits 1134 an RRC connection reconfiguration complete to base station 106, similar to event 234. Accordingly, UE 102 operates 1128 in a connected state with base station 106 via the DRB or the SRB, and therefore UE 102 and base station 106 can communicate 1130 via the DRB or the SRB, similar to events 328 and 330.

Figure 12:
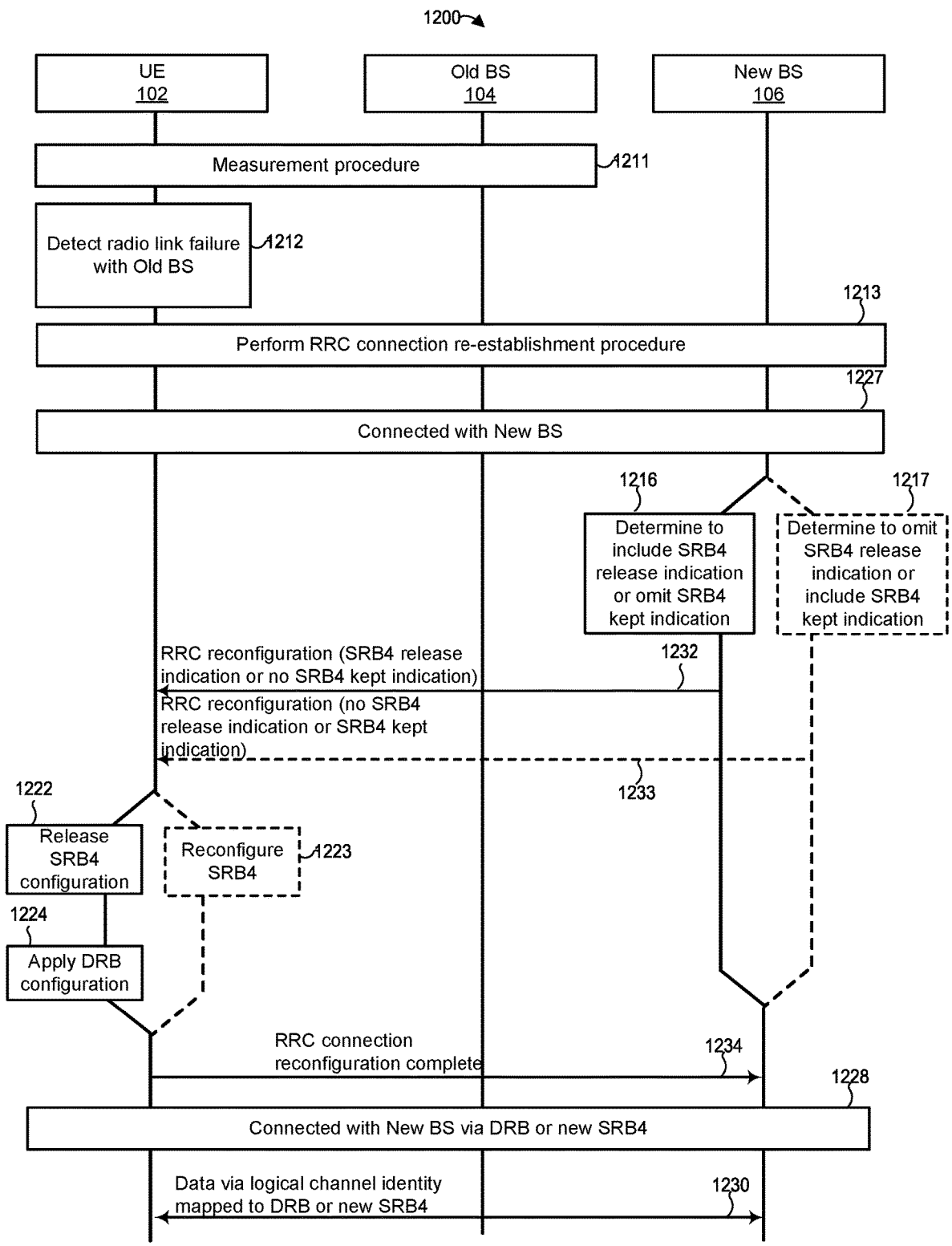
FIG. 12 illustrates an example message flow diagram of a re-establishment scenario in which a base station determines to either include or omit an explicit indicator in a message associated with a procedure for re-establishing a radio connection to release or reconfigure SRB4, in accordance with the techniques of this disclosure.

Turning now to FIG. 12, at the beginning of a scenario 1200, UE 102 and base stations 104, 106 proceed to events 1211, 1212, 1213, and 1227, similar to events 911, 912, 913, and 927.

In some embodiments, base station 106 proceeds to event 1216, similar to event 516, and subsequently transmits 1232 an RRC Reconfiguration message including an SRB4 release indication or omitting an SRB4 kept indication to UE 102, similar to event 232. In response, UE 102 proceeds to events 1222 and 1224, similar to events 522, 524.

In other embodiments, base station 106 proceeds to event 1217, similar to event 517, and subsequently transmits 1233 an RRC Reconfiguration message omitting an SRB4 release indication or including an SRB4 kept indication to UE 102, similar to event 232. In response, UE 102 proceeds to event 1223, similar to event 523.

In response to either applying 1224 the DRB configuration or reconfiguring 1223 the SRB, UE 102 transmits 1234 an RRC connection reconfiguration complete to base station 106, similar to event 234. Accordingly, UE 102 operates 1228 in a connected state with base station 106 via the DRB or the SRB, and therefore UE 102 and base station 106 can communicate 1230 via the DRB or the SRB, similar to events 528 and 530.

Figure 13:
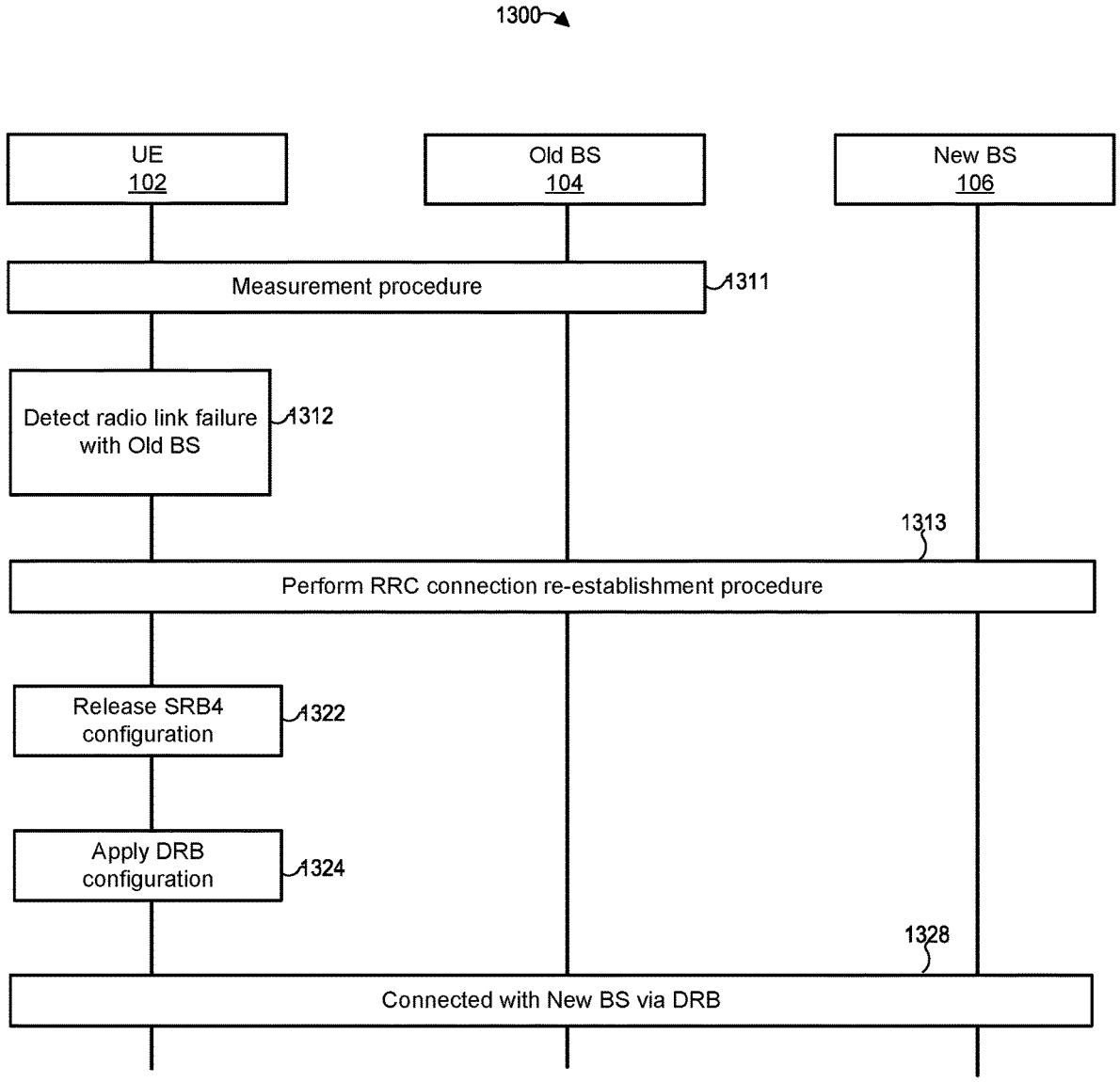
FIG. 13 illustrates an example message flow diagram of a re-establishment scenario in a UE automatically releases SRB4 in view of an RRC connection re-establishment procedure, in accordance with the techniques of this disclosure.

Turning now to FIG. 13, at the beginning of a scenario 1300, UE 102 and base stations 104, 106 proceed to events 1311, 1312, and 1313, similar to events 911, 912, and 913. After performing the RRC connection re-establishment procedure successfully, UE 102 proceeds to events 1322, 1324, and 1328 similar to events 622, 624, and 628. As such, UE 102 releases SRB4 automatically in response to the RRC connection re-establishment procedure or after the re-establishment scenario is complete.

FIGS. 14-18 and 19A-19C generally illustrate example message flow diagrams of the re-selection scenario between UE 102 and base stations 104, 106 of wireless communication system 100.

Figure 14:
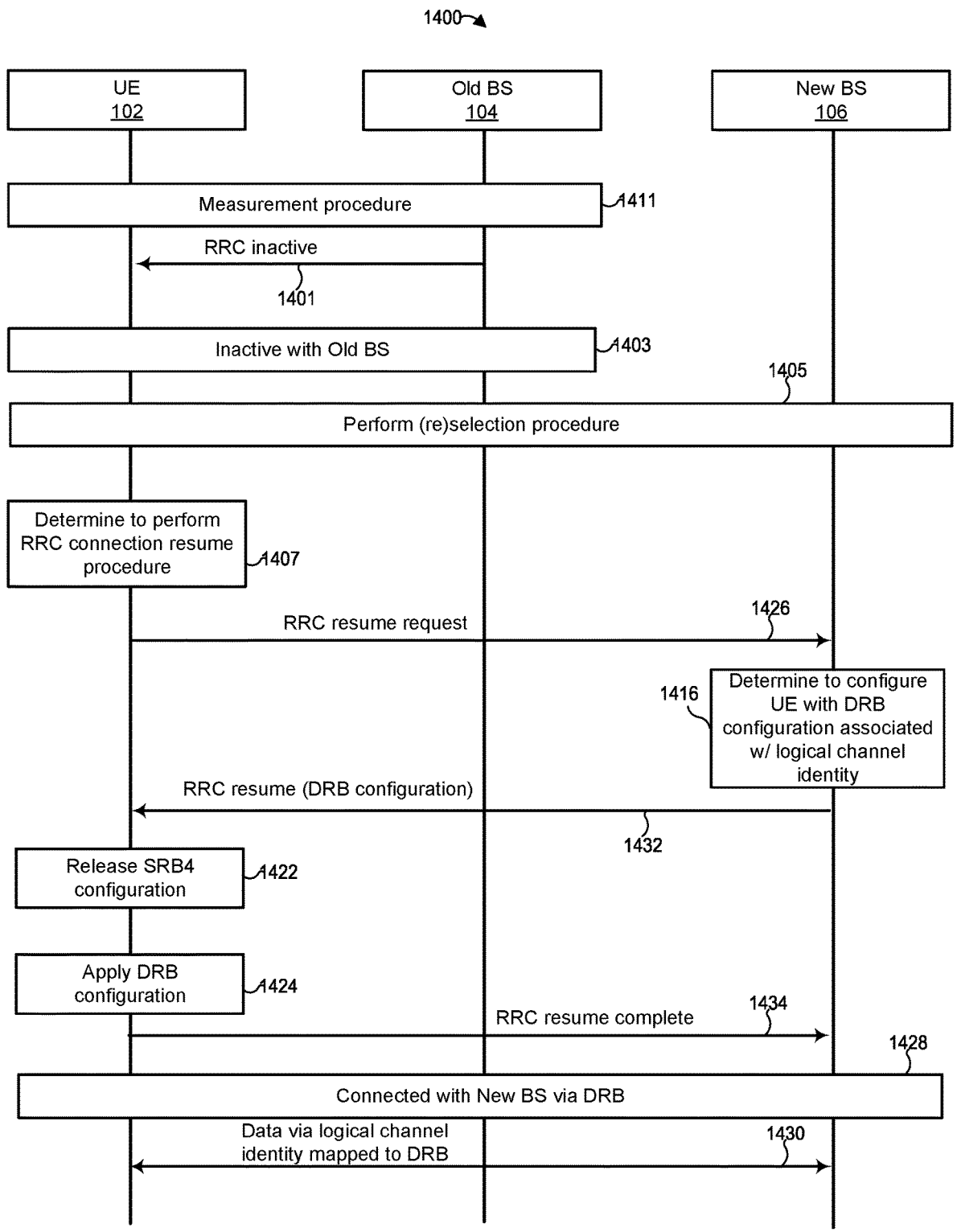
FIG. 14 illustrates an example message flow diagram of a re-selection scenario in which a base station determines to include a configuration for a DRB in a message associated with a procedure for resuming a previously suspended radio connection to release SRB4, in accordance with the techniques of this disclosure.

Turning now to FIG. 14, at the beginning of a scenario 1400, UE 102 and base station 104 perform 1411 the measurement procedure, similar to event 211. After a period of time, base station 104 may detect that below-threshold or no-data activity for UE 102 has occurred over some interval of time over the established connection. Upon this detection, base station 104 instructs UE 102 to enter into an inactive state of the RAT protocol (e.g., EUTRA-RRC INACTIVE, NR-RRC INACTIVE) by transmitting 1401 an RRC Inactive message (e.g., an RRCConnectionRelease message or an RRCRelease message) to UE 102. In some embodiments, the RRCConnectionRelease message includes an rrc-InactiveConfig field and the RRCRelease message includes a suspendConfig field.

In response to the RRC Inactive message, UE 102 enters 1403 the inactive state.

At some point in time thereafter, such as when UE 102 has moved into a different coverage area and has payload data to transmit to the wireless communication system 100, UE 102 (which is in the inactive state) selects or reselects base station 106 for servicing by performing 1405 a (re)selection procedure. After UE 102 selects or reselects base station 106, UE 102 determines to perform 1407 an RRC connection resume procedure with base station 106, such as by transmitting a NAS message to base station 106 or performing a RAN Notification Area (RNA) update. UE 102 transmits 1426 an RRC Resume Request message (e.g., an RRCConnectionResumeRequest message or an RRCResumeRequest message) to base station 106.

In response, base station 106 determines 1416 to configure UE 102 with a DRB configuration associated with the same logical channel identity value as the configured SRB4, similar to event 216, either because base station 106 does not support or is otherwise unaware of the configured SRB, or because base station 106 supports the configured SRB4 yet intends to release the configured SRB4 (i.e., hence the logical channel identity value that was assigned to the configured SRB4 is available for proper use by base station 106). Base station 106 includes a configuration for a DRB in an RRC Resume message (e.g., an RRCConnectionResume message or an RRCResume message), and subsequently transmits 1432 the RRC Resume message to UE 102.

The RRC Resume message causes UE 102 to release 1422 the SRB4 and apply 1424 the DRB configuration indicated in the RRC Resume message, similar to events 222 and 224. Accordingly, and advantageously, UE 102 validates the RRC Resume message because the logical channel identity value associated with the DRB configuration is only associated with the DRB configuration and not the SRB4 configuration. In some embodiments, UE 102 can also release the measurement configuration provided by base station 104 at event 1411.

In turn, UE 102 transmits 1434 an RRC Resume Complete message (e.g., an RRCConnectionResumeComplete message, an RRCResumeComplete message) to base station 106, thereby successfully completing the re-selection scenario. Accordingly, UE 102 operates 1428 in a connected state with base station 106, and therefore UE 102 and base station 106 can exchange 1430 data via the logical channel identity mapped to the DRB, similar to events 228 and 230.

Although FIG. 14 illustrates that event 1416 occurs before UE 102 completes the RRC connection resume procedure, in some embodiments, base station 106 may determine 1416 to configure UE 102 with a DRB configuration associated with the same logical channel identity value as the configured SRB4 after UE 102 completes the RRC Resume procedure (i.e., after base station 106 transmits 1432 the RRC Resume message or receives 1434 the RRC Resume Complete message), similar to event 216 of the reconfiguration procedure illustrated in FIG. 2B. Subsequently, base station 106 may perform the remainder of the reconfiguration procedure, to cause UE 102 to release a previously configured SRB4 maintained by base station 104 and apply a DRB configuration provided by base station 106.

Figure 15:
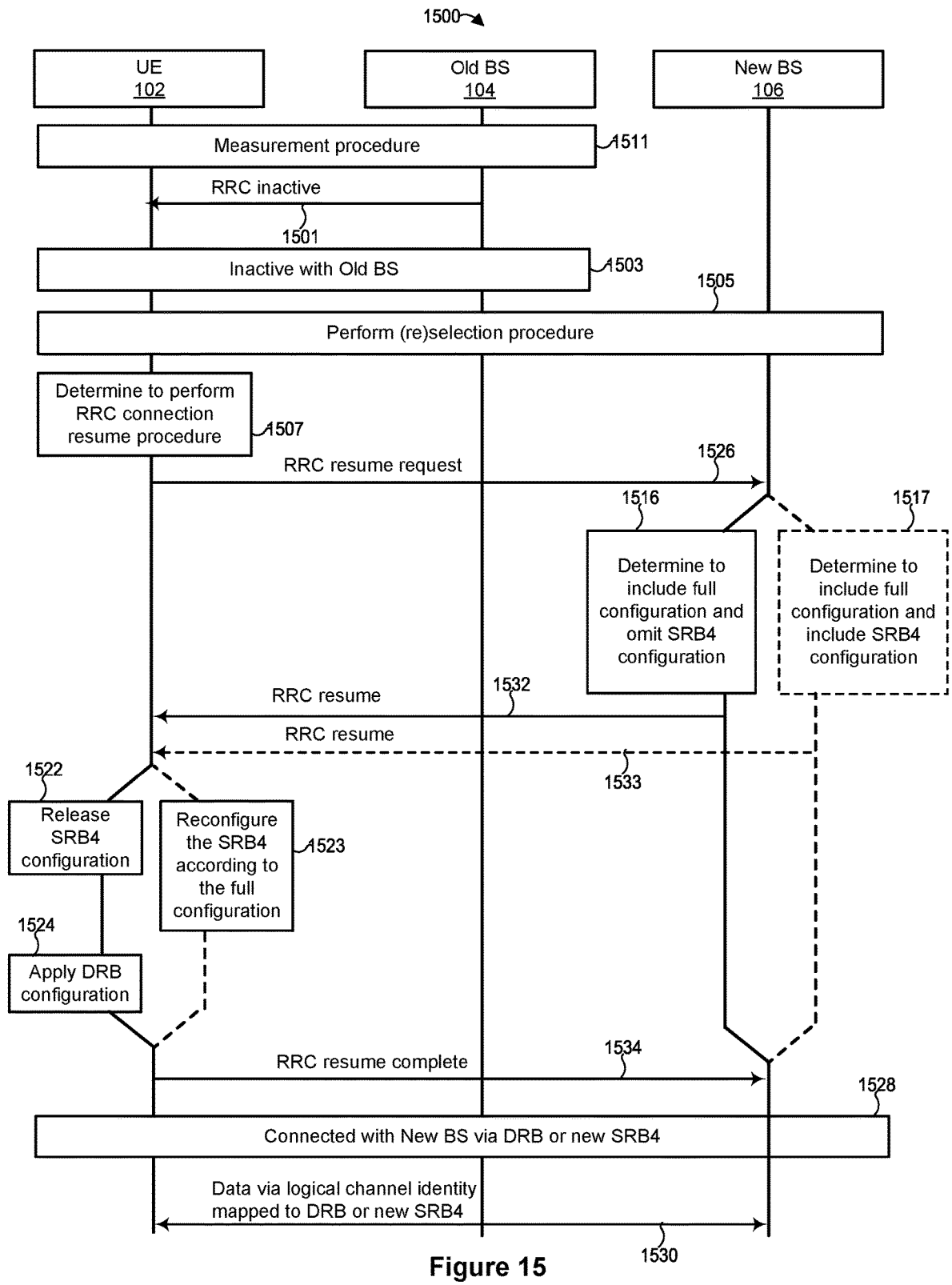
FIG. 15 illustrates an example message flow diagram of a re-selection scenario in which a base station determines to include a full configuration and either omit or include an SRB4 configuration in a message associated with a procedure for resuming a previously suspended radio connection to release or reconfigure SRB4, in accordance with the techniques of this disclosure.

Turning now to FIG. 15, at the beginning of a scenario 1500, UE 102 and base stations 104, 106 proceed to events 1511, 1501, 1503, 1505, 1507, and 1526, similar to events 1411, 1401, 1403, 1405, 1407, and 1426.

In some embodiments, base station 106 proceeds to event 1516, similar to event 1016, and subsequently transmits 1532 an RRC Resume message including a full configuration or delta configuration and omitting an SRB4 configuration to UE 102, similar to event 1432. In response, UE 102 proceeds to events 1522 and 1524, similar to events 1022 and 1024.

In yet other embodiments, base station 106 proceeds to event 1517, similar to event 1017, and subsequently transmits 1533 an RRC Resume message including a full configuration or delta configuration and including an SRB4 configuration to UE 102, similar to event 1432. In response, UE 102 proceeds to event 1523, similar to event 1023.

Although FIG. 15 illustrates that event 1516 (or 1517) may occur before UE 102 completes the RRC connection resume procedure, in other embodiments, base station 106 may determine 1516, 1517 to configure UE 102 with a full configuration or delta configuration and omit (or include) an SRB4 configuration after UE 102 completes the RRC Resume procedure (i.e., after base station 106 transmits 1532 (or 1533) the RRC Resume message or receives 1534 the RRC Resume Complete message from UE 102), similar to event 1016 (or 1017), and subsequently transmit an RRC Reconfiguration message, including a full configuration or delta configuration and omitting (or including) an SRB4 configuration, to UE 102, similar to event 1032 (or 1033) after UE 102 completes the RRC resume procedure. In response, UE 102 proceeds to event 1522 (or 1523).

In response to either applying 1524 the DRB configuration or reconfiguring 1523 the SRB, UE 102 transmits 1534 an RRC Resume Complete message to base station 106, similar to event 1434. Accordingly, UE 102 operates 1528 in a connected state with base station 106 via the DRB or the SRB, and therefore UE 102 and base station 106 can communicate 1530 via the DRB or the SRB, similar to events 1028 and 1030.

Figure 16:
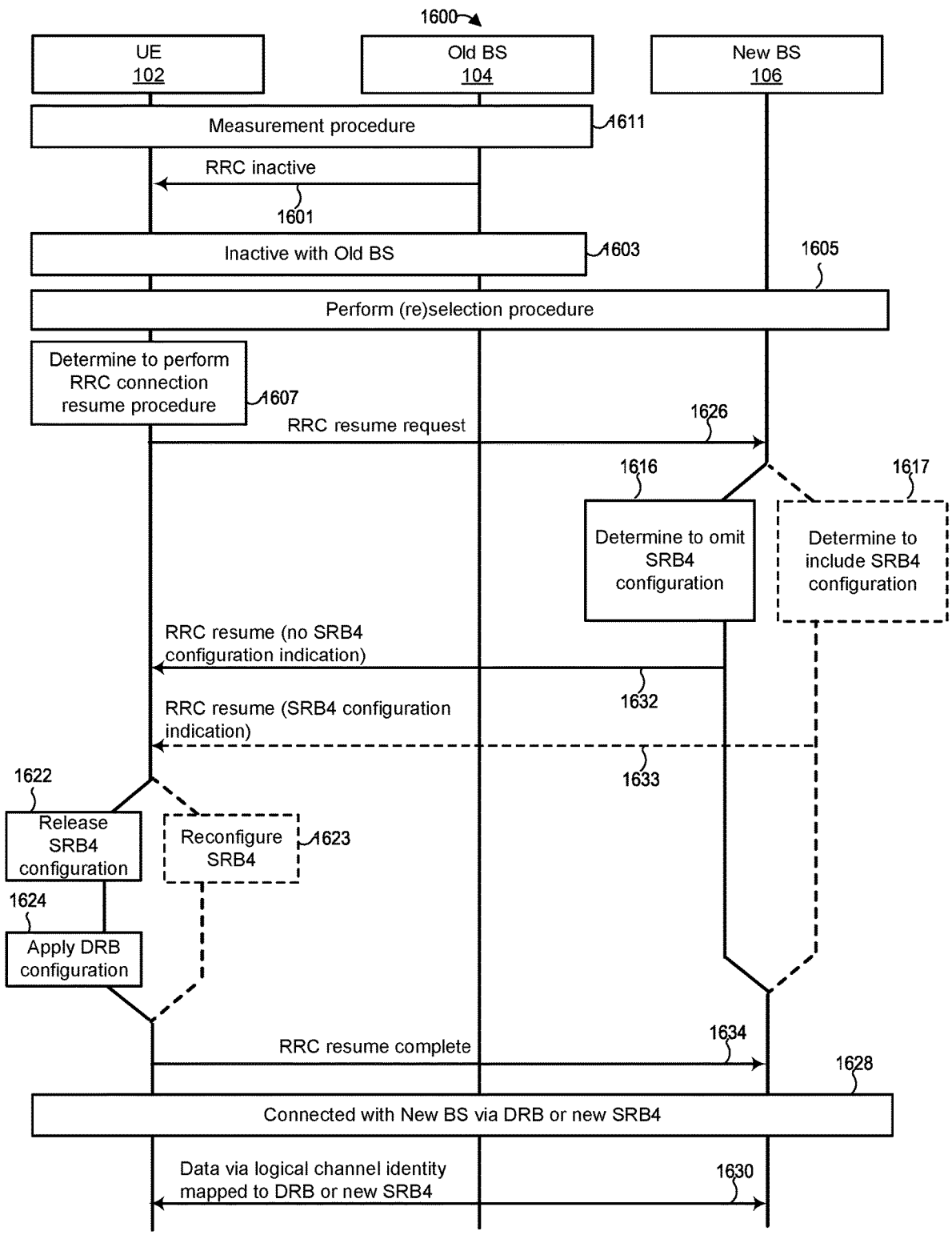
FIG. 16 illustrates an example message flow diagram of a re-selection scenario in which a base station determines to omit or include an SRB4 configuration in a message associated with a procedure for resuming a previously suspended radio connection to release or reconfigure SRB4, in accordance with the techniques of this disclosure.

Turning now to FIG. 16, at the beginning of a scenario 1600, UE 102 and base stations 104, 106 proceed to events 1611, 1601, 1603, 1605, 1607, and 1626, similar to events 1411, 1401, 1403, 1405, 1407, and 1426.

In some embodiments, base station 106 proceeds to event 1616, similar to event 1116, and subsequently transmits 1632 an RRC Resume message omitting an SRB4 configuration to UE 102, similar to event 1432. In response, UE 102 proceeds to events 1622 and 1624, similar to events 1122 and 1124.

In other embodiments, base station 106 proceeds to event 1617, similar to event 1117, and subsequently transmits 1633 an RRC Resume message including an SRB4 configuration to UE 102, similar to event 1432. In response, UE 102 proceeds to event 1623, similar to event 1123.

Although FIG. 16 illustrates that event 1616 (or 1617) may occur before UE 102 completes the RRC connection resume procedure, in other embodiments, base station 106 may determine 1616, 1617 to omit (or include) an SRB4 configuration after UE 102 completes the RRC Resume procedure (i.e., after base station 106 transmits 1632 (or 1633) the RRC Resume message or receives 1634 the RRC Resume Complete message from UE 102), similar to event 1116 (or 1117), and subsequently transmit an RRC Reconfiguration message, omitting (or including) an SRB4 configuration, to UE 102, similar to event 1132 (or 1133) after UE 102 completes the RRC resume procedure. In response, UE 102 proceeds to event 1622 (or 1623).

In response to either applying 1624 the DRB configuration or reconfiguring 1623 the SRB, UE 102 transmits 1634 an RRC Resume Complete message to base station 106, similar to event 1434. Accordingly, UE 102 operates 1628 in a connected state with base station 106 via the DRB or the SRB, and therefore UE 102 and base station 106 can communicate 1630 via the DRB or the SRB, similar to events 1128 and 1130.

Figure 17:
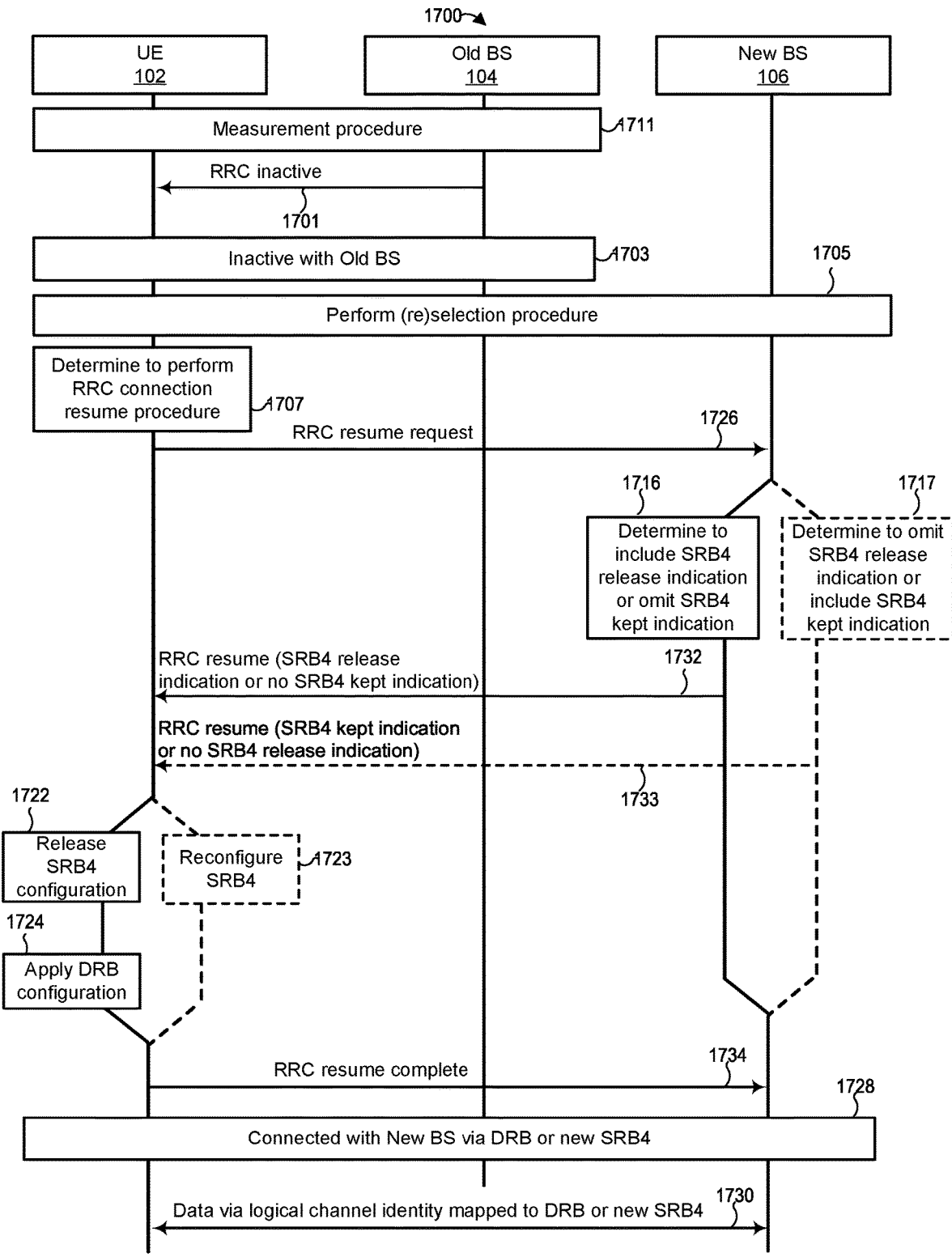
FIG. 17 illustrates an example message flow diagram of a re-selection scenario in which a base station determines to either include or omit an explicit indicator in a message associated with a procedure for resuming a previously suspended radio connection to release or reconfigure SRB4, in accordance with the techniques of this disclosure.

Turning now to FIG. 17, at the beginning of a scenario 1700, UE 102 and base stations 104, 106 proceed to events 1711, 1701, 1703, 1705, 1707, and 1726, similar to events 1411, 1401, 1403, 1405, 1407, and 1426.

In some embodiments, base station 106 proceeds to event 1716, similar to event 1216, and subsequently transmits 1732 an RRC Resume message including an SRB4 release indication or omitting an SRB4 kept indication to UE 102, similar to event 1432. In response, UE 102 proceeds to events 1722 and 1724, similar to events 1222 and 1224.

In other embodiments, base station 106 proceeds to event 1717, similar to event 1217, and subsequently transmits 1733 an RRC Resume message omitting an SRB4 release indication or including an SRB4 kept indication to UE 102, similar to event 1432. In response, UE 102 proceeds to event 1723, similar to event 1223.

Although FIG. 17 illustrates that event 1716 (or 1717) may occur before UE 102 completes the RRC connection resume procedure, in other embodiments, base station 106 may determine 1716, 1717 to include (or omit) an SRB4 release indication or omit (or include) an SRB4 kept indication after UE 102 completes the RRC Resume procedure (i.e., after base station 106 transmits 1732 (or 1733) the RRC Resume message or receives 1734 the RRC Resume Complete message from UE 102), similar to event 1216 (or 1217), and subsequently transmit an RRC Reconfiguration message, including (or omitting) an SRB4 release indication or omitting (or including) an SRB4 kept indication, to UE 102, similar to event 1232 (or 1233) after UE 102 completes the RRC resume procedure. In response, UE 102 proceeds to event 1722 (or 1723).

In response to either applying 1724 the DRB configuration or reconfiguring 1723 the SRB, UE 102 transmits 1734 an RRC Resume Complete message to base station 106, similar to event 1434. Accordingly, UE 102 operates 1728 in a connected state with base station 106 via the DRB or the SRB, and therefore UE 102 and base station 106 can communicate 1730 via the DRB or the SRB, similar to events 1228 and 1230.

Figure 18:
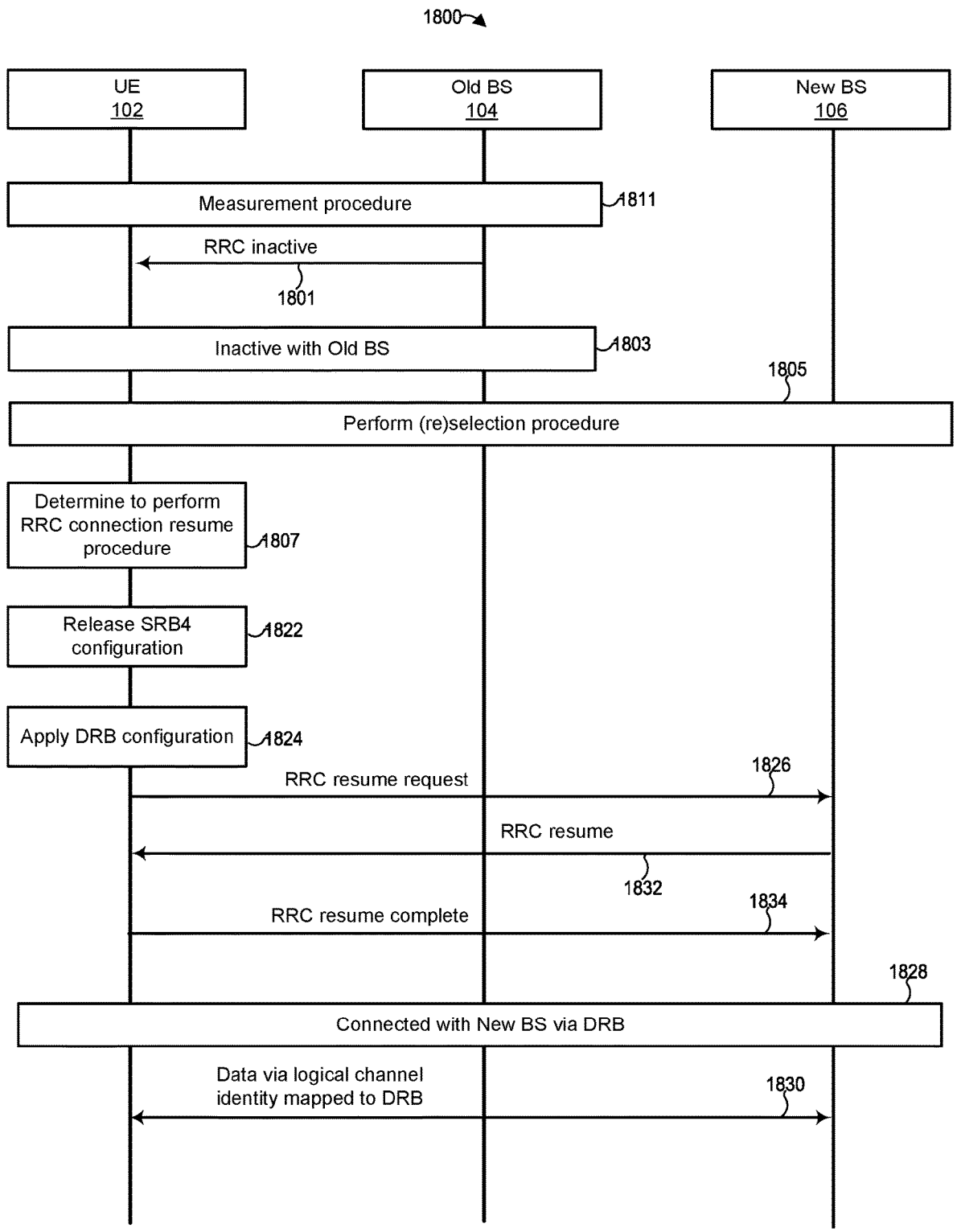
FIG. 18 illustrates an example message flow diagram of a re-selection scenario in a UE automatically releases SRB4 in view of an RRC connection resume procedure, in accordance with the techniques of this disclosure.

Turning now to FIG. 18, at the beginning of a scenario 1800, UE 102 and base stations 104, 106 proceed to events 1811, 1801, 1803, 1805, and 1807, similar to events 1411, 1401, 1403, 1405, and 1407. In other embodiments, UE 102 may determine 1807 to perform the RRC connection resume procedure after transmitting 1826 the RRC resume request message to base station 106.

After performing the RRC connection resume procedure successfully, UE 102 proceeds to events 1822 and 1824, similar to events 1422 and 1424. In turn, UE 102 and base station 106 proceed to events 1826, 1832, 1834, 1828, and 1830, similar to events 1426, 1432, 1434, 1428, and 1430. As such, UE 102 releases SRB4 automatically after the re-selection scenario is complete.

In other embodiments, UE 102 releases SRB4 in response to the RRC connection resume procedure (e.g., after UE 102 receives 1832 the RRC resume message from base station 106 or after UE 102 transmits 1834 the RRC Resume complete message to base station 106).

Figure 19A:
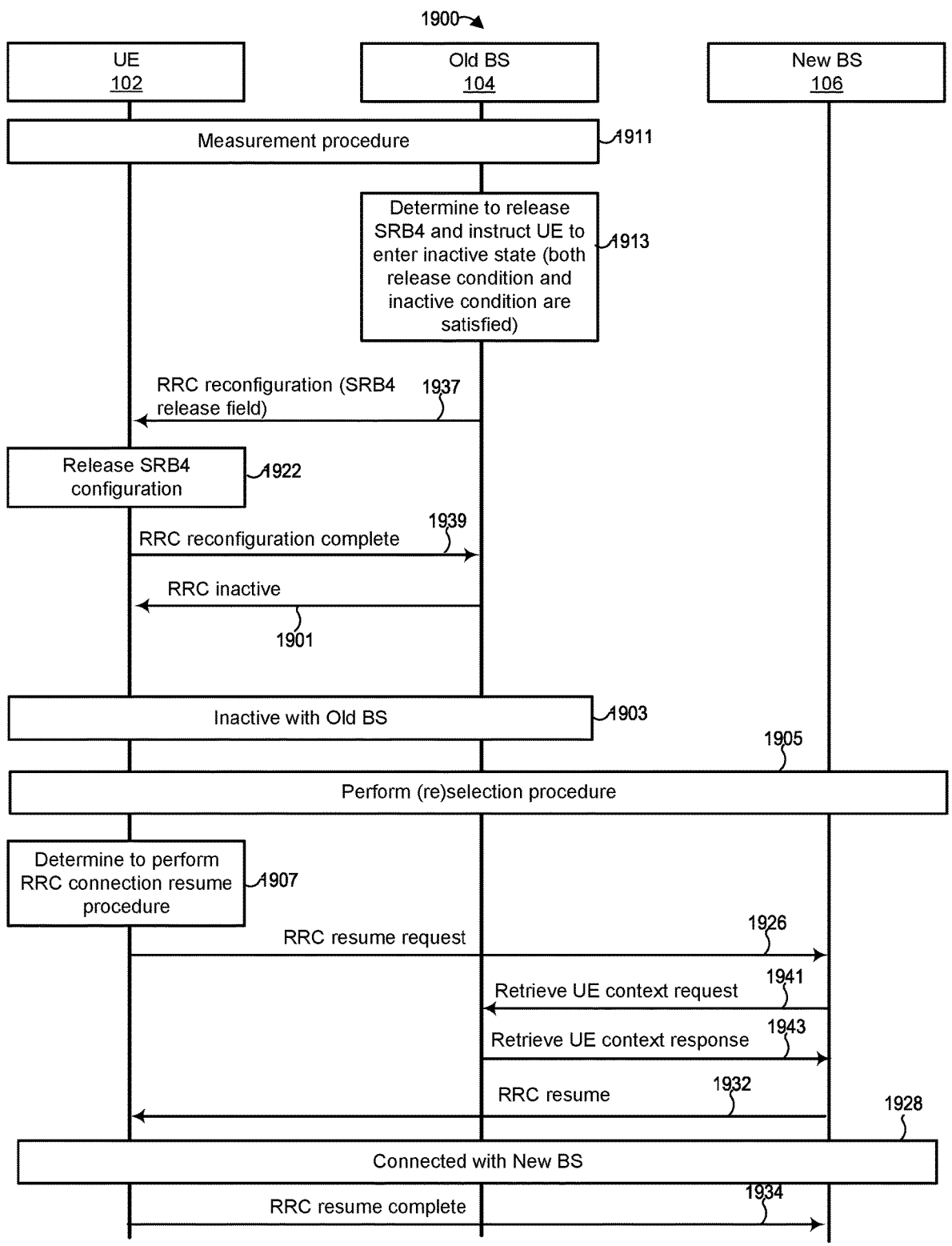
FIG. 19A illustrates an example message flow diagram of a re-selection scenario in which a base station determines to include an explicit indicator in a message associated with a procedure for resuming a previously suspended radio connection to release SRB4 when an SRB4 release condition and an inactive condition are satisfied, in accordance with the techniques of this disclosure.

Turning now to FIG. 19A, at the beginning of a scenario 1900, UE 102 and base station 104 perform 1911 the measurement procedure, similar to event 1411. After a period of time, base station 104 may determine 1913 to not only instruct UE 102 to enter into an inactive state of the RAT protocol, but also release SRB4. In other words, base station 104 may determine that it should release SRB4 if an SRB4 release condition is the same as an inactive condition. For example, when base station 104 detects that data activity for UE 102 is below a first threshold over a first interval of time over the established connection, the data activity satisfies the inactive condition (and also the SRB4 release condition), and accordingly base station 104 sends 1937 the RRC Reconfiguration message (e.g., an RRCConnectionReconfiguration message or an RRCReconfiguration message) to UE 102, similar to event 737, to cause UE 102 to release 1922 SRB4. After releasing SRB4, UE 102 transmits 1939 an RRC Reconfiguration Complete message (e.g., an RRCConnectionReconfigurationComplete message, an RRCReconfigurationComplete message) to base station 104, similar to event 739, thereby completing the SRB4 release. In addition, base station 104 sends 1901 the RRC Inactive message to UE 102 to instruct UE 102 to enter into an inactive state of the RAT protocol (e.g., EUTRA-RRC INACTIVE, NR-RRC INACTIVE), similar to event 1401.

In other implementations, base station 104 determines to release SRB4 if the SRB4 release condition is similar but not identical to the inactive condition. For example, with reference to FIG. 19B, when base station 104 detects that data activity for UE 102 is below the first threshold over the first interval of time and above a second threshold over a second interval of time (where the second interval of time may be shorter than the first interval of time) over the established connection, base station 104 determines 1915 that the data activity satisfies the SRB4 release condition, but does not satisfy the inactive condition, and accordingly base station 104 sends 1937 the RRC reconfiguration message to UE 102, similar to event 737, to cause UE 102 to release 1922 SRB4. After releasing SRB4, UE 102 transmits 1939 an RRC Reconfiguration Complete message (e.g., an RRCConnectionReconfigurationComplete message, an RRCReconfigurationComplete message) to base station 104, similar to event 739, thereby successfully completing the SRB4 release. If the base station 106 subsequently detects that data activity for UE 102 is below the second threshold over the second interval of time over the established connection, the base station 104 determines 1916 that the data activity satisfies the inactive condition, and accordingly, base station 104 sends 1901 the RRC Inactive message to UE 102, similar to event 1401, to instruct UE 102 to enter into an inactive state of the RAT protocol (e.g., EUTRA-RRC INACTIVE, NR-RRC INACTIVE).

Figure 19B:
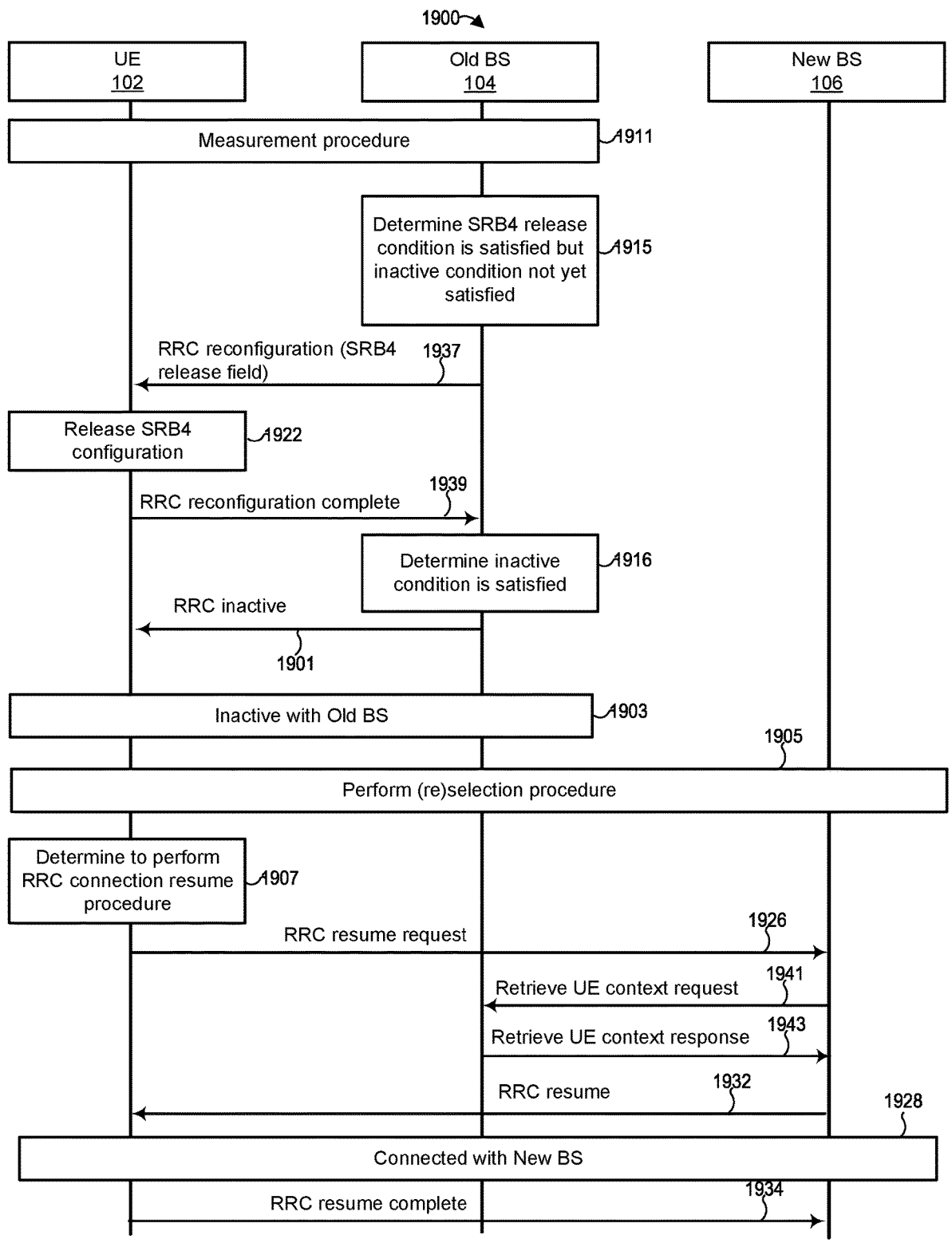
FIG. 19B illustrates an example message flow diagram of a re-selection scenario in which a base station determines to include an explicit indicator in a message associated with a procedure for resuming a previously suspended radio connection to release SRB4 when an SRB4 release condition is satisfied before an inactive condition is satisfied, in accordance with the techniques of this disclosure.
Figure 19C:
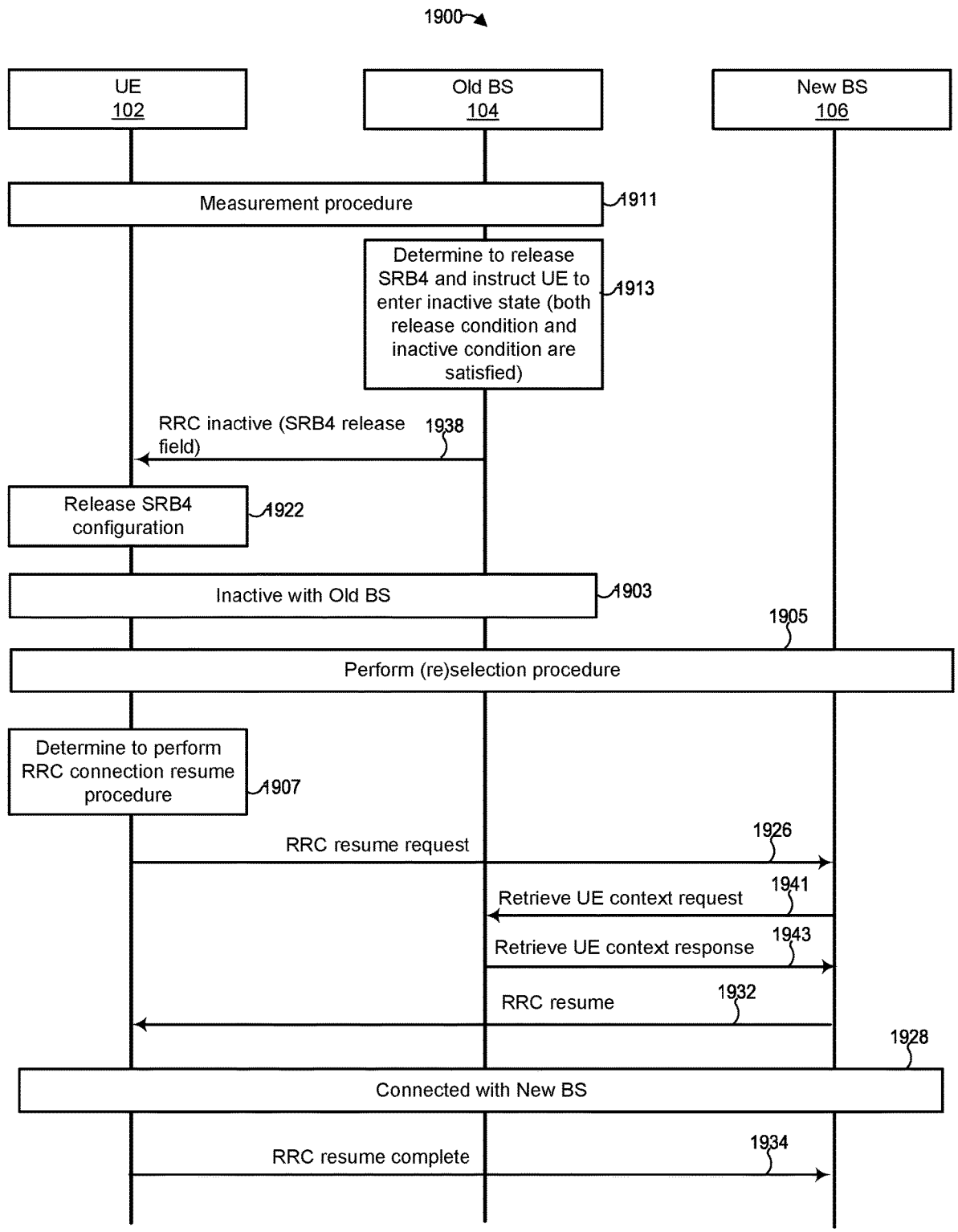
FIG. 19C illustrates an example message flow diagram of a re-selection scenario in which a base station determines to include an explicit indicator in another message associated with a procedure for resuming a previously suspended radio connection to release SRB4 when an SRB4 release condition and an inactive condition are satisfied, in accordance with the techniques of this disclosure.

Now referring to the scenario of FIG. 19C, when base station 104 in another implementation determines that the data activity satisfies the inactive condition (and also the SRB4 release condition), base station 104 may send 1938 an RRC Inactive message (e.g., an RRCConnectionRelease message or an RRCRelease message) to UE 102, in contrast to event 1937 of FIG. 19A and similar to event 1401 in FIG. 14, to cause UE 102 to release 1922 SRB4. Base station 104 may include a dedicated field (e.g., a SRB4 release indicator, a srb-ToReleaseListExt-r15 or a SRB4 configuration) in the RRC Inactive message to instruct UE 102 to enter into an inactive state of the RAT protocol (e.g., EUTRA-RRC INACTIVE, NR-RRC INACTIVE). After releasing SRB4, UE 102 may optionally transmit a confirmation message to base station 104.

Referring now to FIGS. 19A, 19B, and 19C, after UE 102 receives the RRC Inactive message, UE 102 and base stations 104, 106 proceed to events 1903, 1905, 1907, and 1926, similar to events 1403, 1405, 1407, and 1426.

In response to the RRC Resume Request message, base station 106 sends 1941 a Retrieve UE Context Request message to base station 104 to retrieve a UE context of UE 102. In response, base station 104 sends 1943 a Retrieve UE Context Response message including the UE context. In response to the Retrieve UE Context Response message, base station 106 sends 1932 an RRC Resume message to UE 102, similar to event 1432. In response, UE 102 operates 1928 in a connected state with base station 106 and transmits 1934 an RRC Resume Complete message (e.g., an RRCConnectionResumeComplete message or an RRCResumeComplete message) to base station 106, thereby successfully completing the re-selection scenario.

Because base station 104 causes UE 102 to release SRB4, which base station 106 may not support, base station 106 does not receive the SRB4 configuration from base station 104 in event 1943, and further avoids providing a configuration to UE 102 that could have conflicted with the released SRB4. That is, if base station 106 determines to configure UE 102 with a DRB configuration or new SRB4 configuration (included in the RRC Resume message at event 1932, or separately in an RRC Reconfiguration message, similar to event 232) associated with the same logical channel identity value as the released SRB4, UE 102 validates the RRC Resume message or the RRC Reconfiguration message because the logical channel identity value associated with the DRB configuration or new SRB4 configuration is not associated with the released SRB4 configuration.

Figure 20:
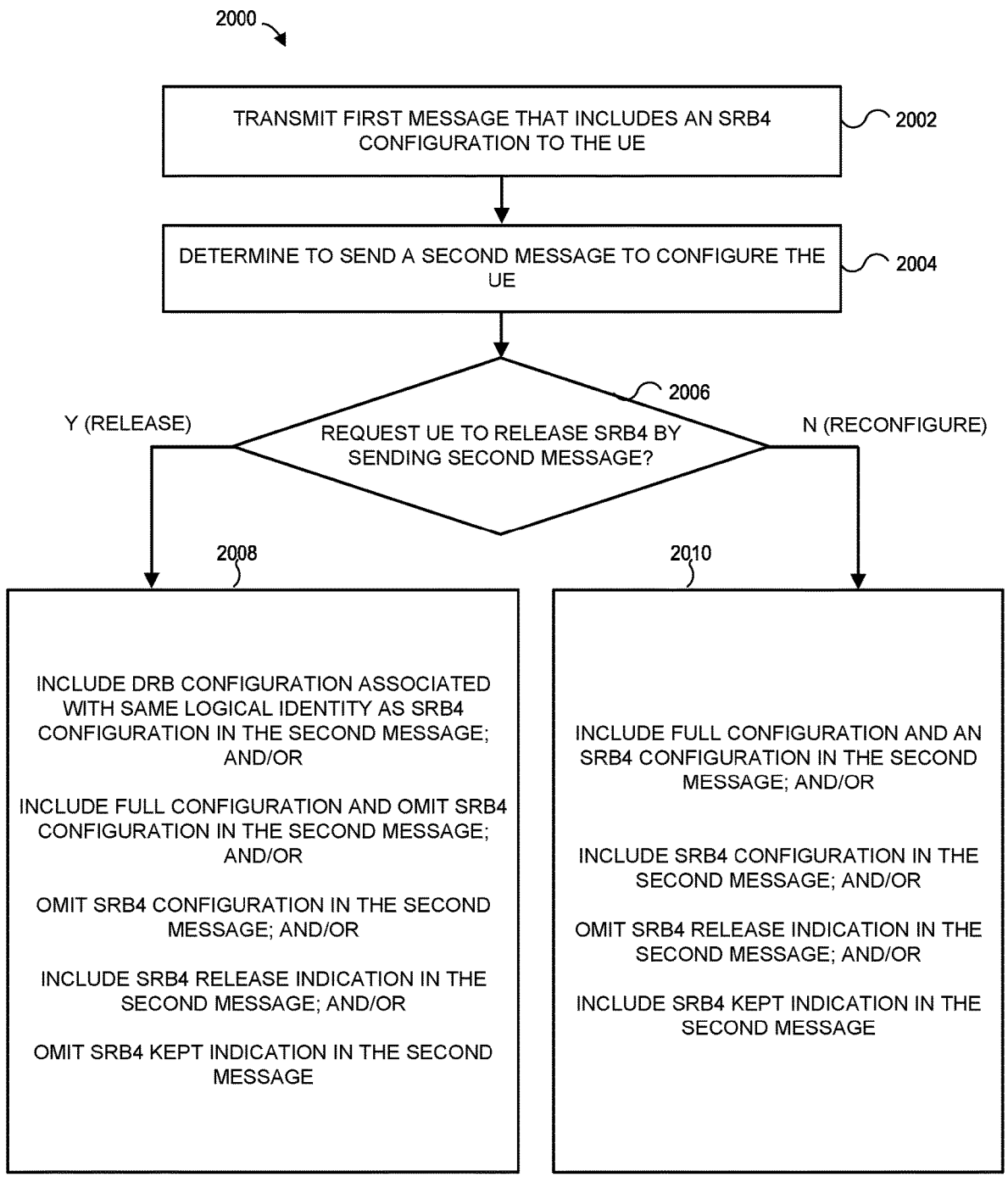
FIG. 20 is a flow diagram of an example method in a base station for causing a UE to release or reconfigure SRB4 in view of inclusion and/or exclusion of a particular type of configuration, in accordance with the techniques of this disclosure.
Figure 21:
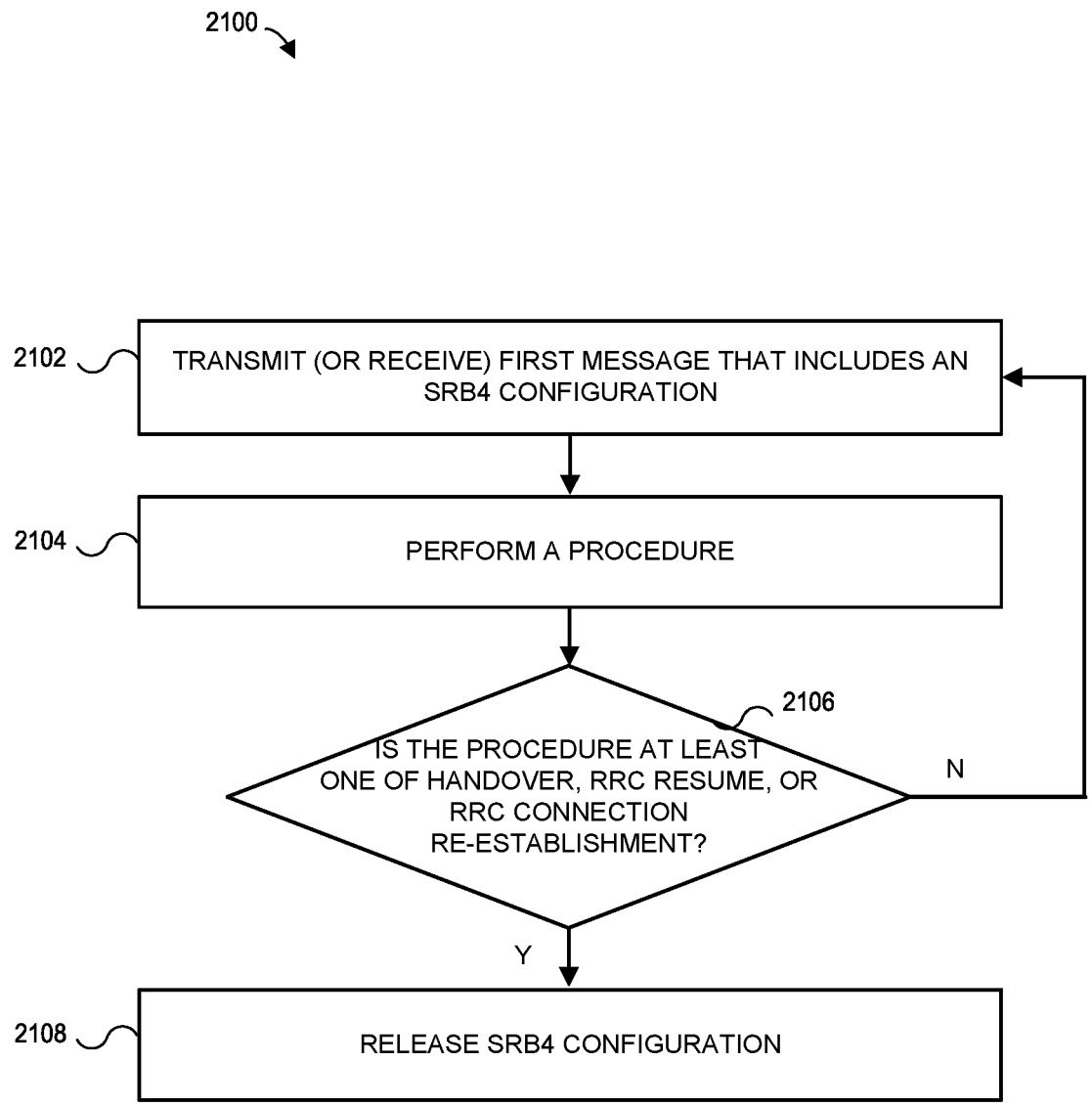
FIG. 21 is a flow diagram of an example method in either a UE or a base station for automatically releasing SRB4 in view of a type of procedure, in accordance with the techniques of this disclosure.
Figure 22:
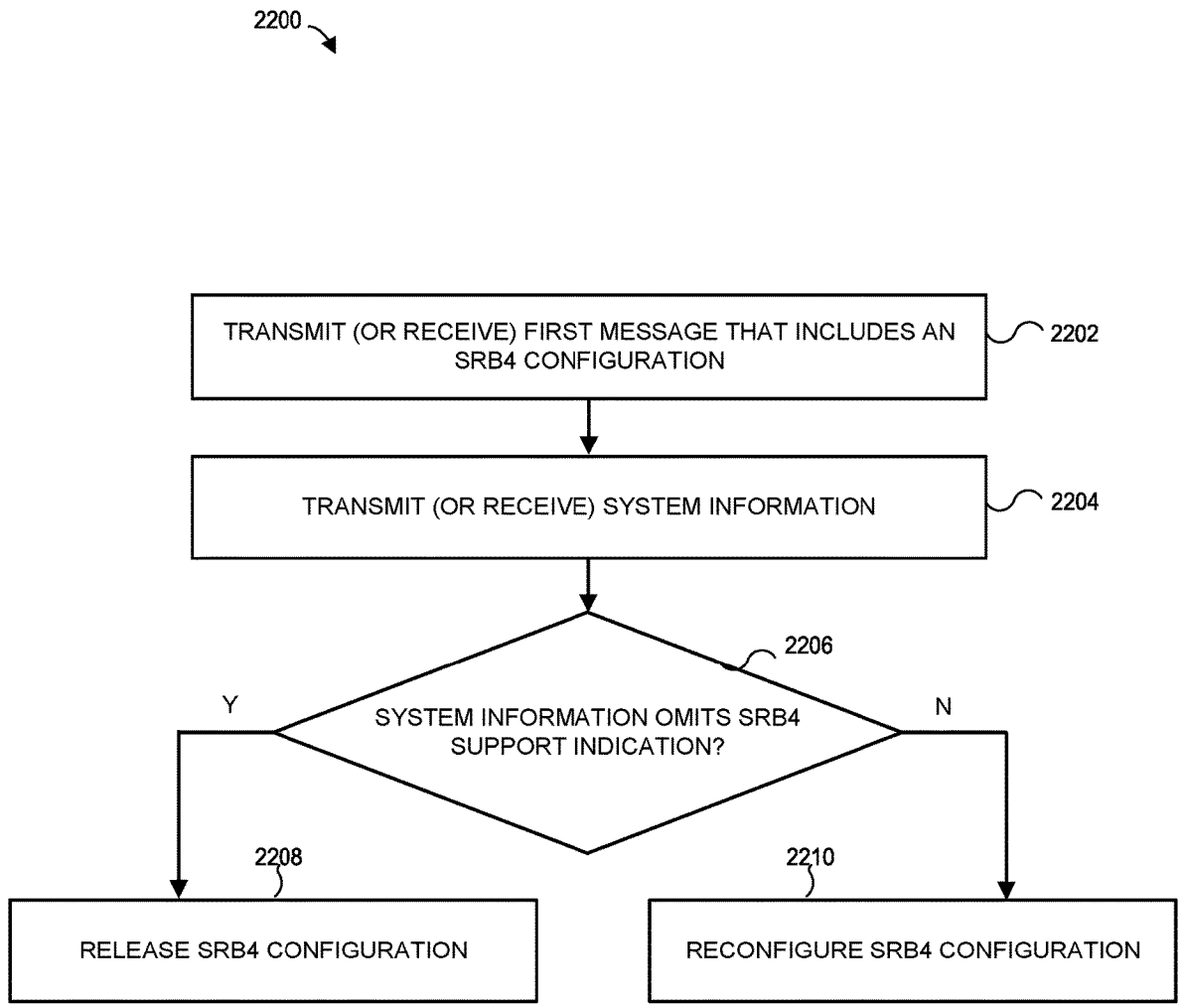
FIG. 22 is a flow diagram of an example method in either a UE or a base station for releasing or reconfiguring SRB4 in view of inclusion and/or exclusion of a particular type of indication in system information, in accordance with the techniques of this disclosure.

FIGS. 20-22 generally illustrate example message flow diagrams for managing radio bearers in view of a particular triggering event.

Turning now to FIG. 20, method 2000 releases or reconfigures an SRB4 in view of inclusion and/or exclusion of a particular type of configuration indication, which can be implemented in base stations 104, 106 of FIG. 1.

The method 2000 begins at block 2002, where a first base station (e.g., base station 104) transmits a first message (e.g., RRC Reconfiguration message) that includes an SRB4 configuration to the UE (e.g., UE 102) (event 206 of FIG. 2A).

At block 2004, a second base station (e.g., base station 106) determines to send a second message (e.g., Handover Command message, RRC Reconfiguration message, RRC Resume message) to configure the UE (events 220, 232, 320, 321, 420, 520, 521, 619, 1032, 1033, 1132, 1133, 1232, 1233, 1432, 1532, 1533, 1632, 1633, 1732, and 1733 of FIGS. 2A-2B, 3-6, 10-12, and 14-17).

At block 2006, if the second base station determines to request the UE to release the SRB, the second base station at block 2008 can (i) include indication of a DRB configuration associated with same logical identity as the SRB4 configuration in the second message (events 216, 935, and 1416 of FIGS. 2A-2B, 9, and 14); and/or (ii) include a full configuration or delta configuration and omit an SRB4 configuration in the second message (events 316, 1016, and 1516 of FIGS. 3, 10, and 15); and/or (iii) omit an SRB4 configuration in the second message (events 416, 1116, and 1616 of FIGS. 4, 11, and 16); and/or (iv) include an SRB4 release indication in the second message (events 516, 1216, and 1716 of FIGS. 5, 12, and 17); and/or (v) omit an SRB4 kept indication in the second message (events 516, 1216, and 1716 of FIGS. 5, 12, and 17).

If the second base station determines to request the UE to reconfigure the SRB4, the second base station at block 2010 can (i) include a full configuration or delta configuration and an SRB4 configuration in the second message (events 317, 1017, and 1517 of FIGS. 3, 10, and 15); and/or (ii) include an SRB4 configuration in the second message (events 1117 and 1617 of FIGS. 11 and 16); and/or (iii) omit an SRB4 release indication in the second message (events 517, 1217, and 1717 of FIGS. 5, 12, and 17); and/or (iv) include an SRB4 kept indication in the second message (events 517, 1217, and 1717 of FIGS. 5, 12, and 17).

Turning now to FIG. 21, method 2100 automatically releases an SRB4 in view of a type of procedure, which can be implemented in either UE 102 or base station 104 of FIG. 1.

The method 2100 begins at block 2102, where a first base station (e.g., base station 104) transmits a first message (e.g., RRC Reconfiguration message) that includes an SRB4 configuration, and the UE (e.g., UE 102) receives the first message (event 206 of FIG. 2A).

At block 2104, either the first base station or UE performs a procedure. For example, as illustrated in FIG. 6, base station 104 performs a handover procedure at event 612. As illustrated in FIG. 13, UE 102 performs an RRC connection re-establishment procedure at event 1313. As illustrated in FIG. 18, UE 102 performs an RRC connection resume procedure.

At block 2106, if the first base station or UE performs at least one of the handover procedure, RRC connection re-establishment procedure, or RRC connection resume procedure, the UE at block 2108 automatically releases SRB4 (events 622, 1322, and 1822 of FIGS. 6, 13, and 18). Otherwise, the method 2100 ends or proceeds back to block 2102.

Turning now to FIG. 22, method 2200 releases or reconfigures an SRB4 in view of inclusion and/or exclusion of a particular type of indication in system information, which can be implemented in either UE 102 or base stations 104, 106 of FIG. 1.

The method 2200 begins at block 2202, where a first base station (e.g., base station 104) transmits a first message (e.g., RRC Reconfiguration message) that includes an SRB4 configuration, and the UE (e.g., UE 102) receives the first message (event 206 of FIG. 2A).

At block 2204, after the first base station successfully performs a handover procedure, so that the UE establishes a connection with a second base station (e.g., base station 106), the second base station transmits or broadcasts system information, and the UE receives the system information (events 832, 833 of FIG. 8).

At block 2206, if the second base station determines to omit an SRB4 support indication in the system information, the UE at block 2208 releases SRB4 (event 822 of FIG. 8). At block 2206, if the second base station determines to include an SRB4 support indication in the system information, the UE at block 2210 reconfigures the SRB4 (event 823 of FIG. 8).

Figure 23:
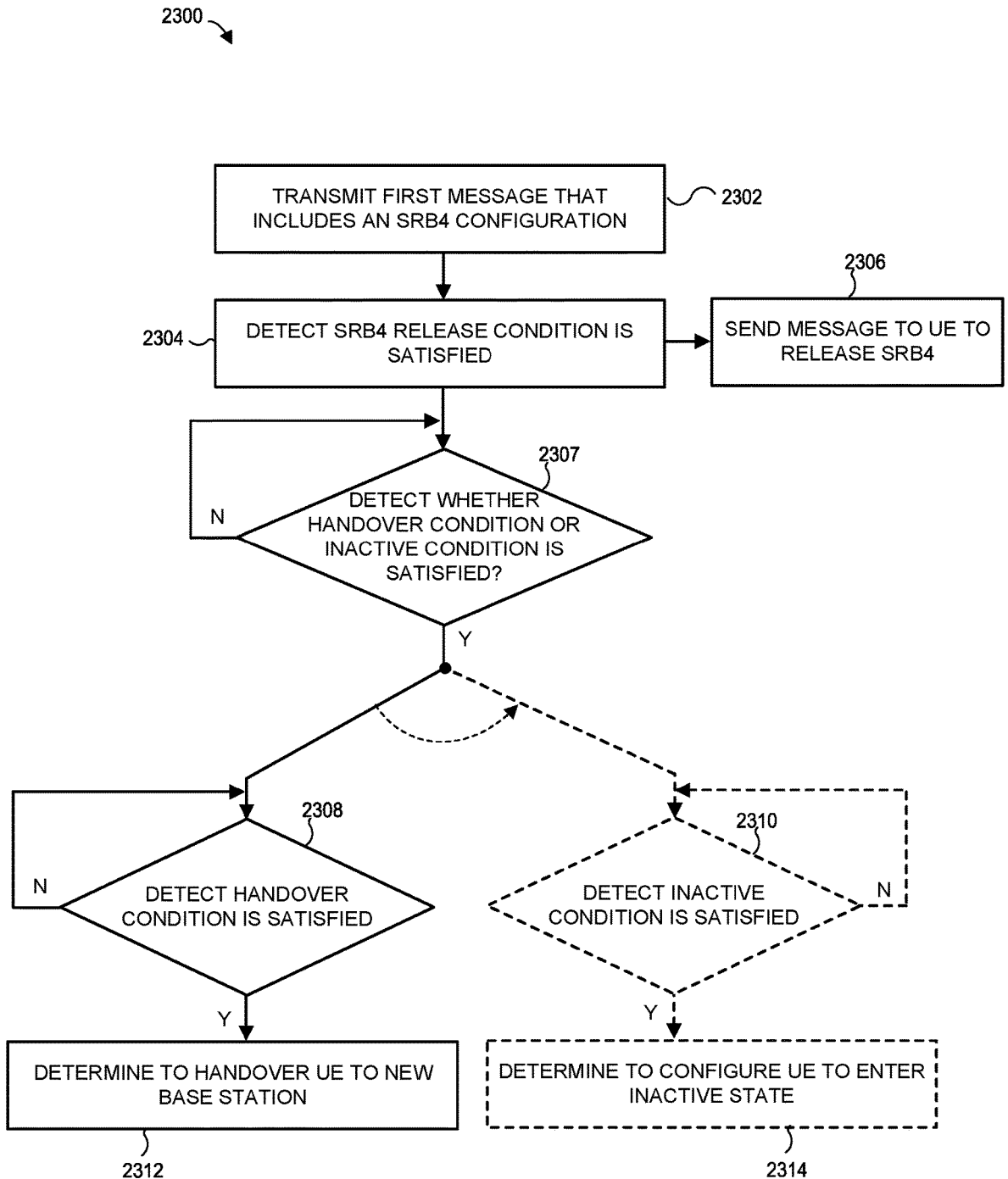
FIG. 23 is a flow diagram of an example method in a base station for releasing SRB4 in view of detecting an SRB4 release condition, in accordance with the techniques of this disclosure.

Turning now to FIG. 23, method 2300 releases an SRB4 in view of whether an SRB4 release condition is satisfied, which can be implemented in base station 104 of FIG. 1.

The method 2300 begins at block 2302, where a first base station (e.g., base station 104) transmits a first message (e.g., RRC Reconfiguration message) that includes an SRB4 configuration, similar to blocks 2002, 2102, and 2202 (events 206, 711, 1911 of FIGS. 2A, 7A, 7B, 19A, 19B, and 19C).

At block 2304, the first base station detects that an SRB4 release condition is satisfied (and optionally, at block 2307, detect whether a handover condition or inactive condition is also satisfied) (events 713, 715, 1913, 1915 of FIGS. 7A, 7B, 19A, 19B, and 19C). The first base station may continue to perform the detection at block 2307 until the first base station detects that either the handover condition or inactive condition is satisfied.

In response, the first base station at block 2306 sends a message (e.g., an RRC Reconfiguration message, an RRC Inactive message) to a UE (e.g., UE 102) to cause the UE to release SRB4 (events 737, 1937, 1938 of FIGS. 7A, 7B, 19A, 19B, and 19C).

In some embodiments, when the first base station at block 2307 optionally detects whether the handover condition or inactive condition is satisfied, the first base station at block 2308 may determine that a handover condition is satisfied after block 2306, and proceed to determine at block 2312 to handover the UE to a second base station (e.g., base station 106) (event 716 of FIG. 7B). The first base station may continue to perform the detection at block 2308 until the first base station detects that a handover condition is satisfied.

Alternatively, the first base station at block 2310 may instead determine that an inactive condition is satisfied after block 2306, and proceed to determine at block 2314 to instruct the UE to enter into an inactive state (event 1916 of FIG. 19B). The first base station may continue to perform the detection at block 2310 until the first base station detects that an inactive condition is satisfied.

Figure 24:
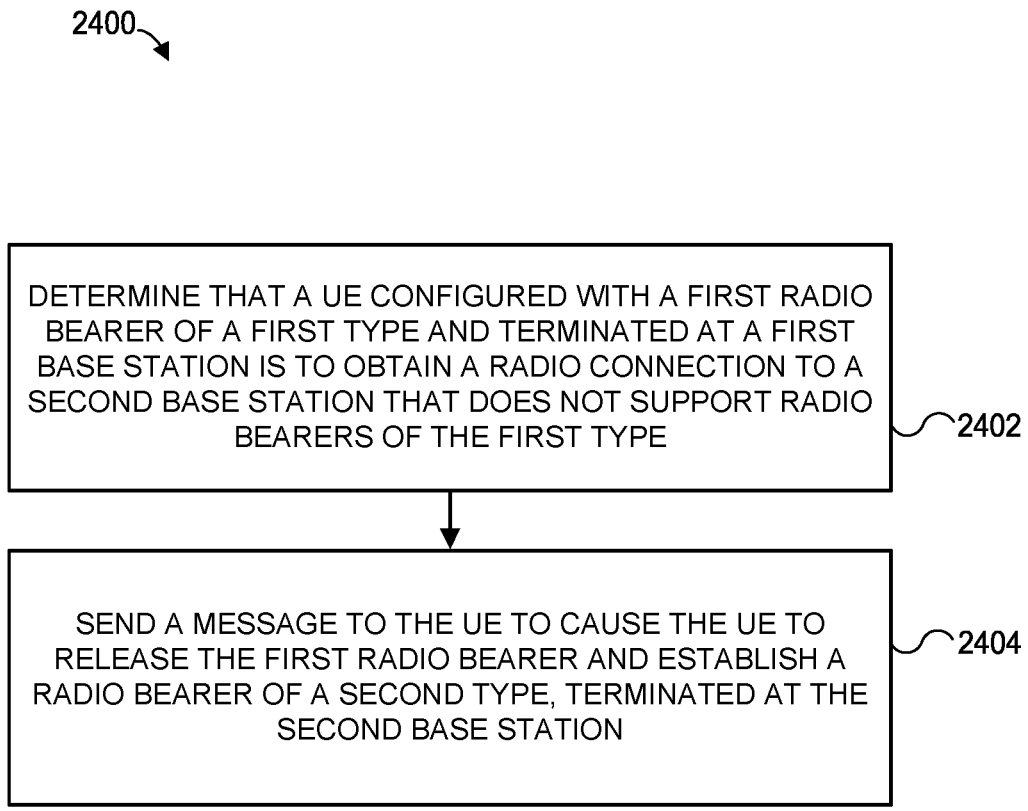
FIG. 24 is a flow diagram of an example method for managing radio bearers, which can be implemented in base station 106 of FIG. 1.

FIG. 24 depicts an example method 2400 for managing radio bearers, which can be implemented in RAN 108 of FIG. 1, which includes first base station 104 that supports radio bearers of a first type and second base station 106 that does not support radio bearers of the first type.

The method 2400 begins at block 2402, where a RAN determines that a UE (e.g., UE 102) configured with a first radio bearer of the first type, the radio bearer terminated at the first base station, is to obtain a radio connection to the second base station (events 212, 312, 412, 512, 612, 713, 716, 812, 913, 1013, 1113, 1213, 1313, 1405, 1505, 1605, 1705, and 1805 of FIGS. 2A-2B and 3-18). Subsequently, the RAN at block 2404 sends a message to cause the UE to release the first radio bearer and establish a second radio bearer of a second type, terminated at the second base station (events 218, 220, 232, 318, 320, 418, 420, 518, 520, 617, 619, 832, 935, 1032, 1132, 1232, 1313, 1432, 1532, 1632, 1732, 1807 of FIGS. 2A-2B and 3-18).

Figure 25:
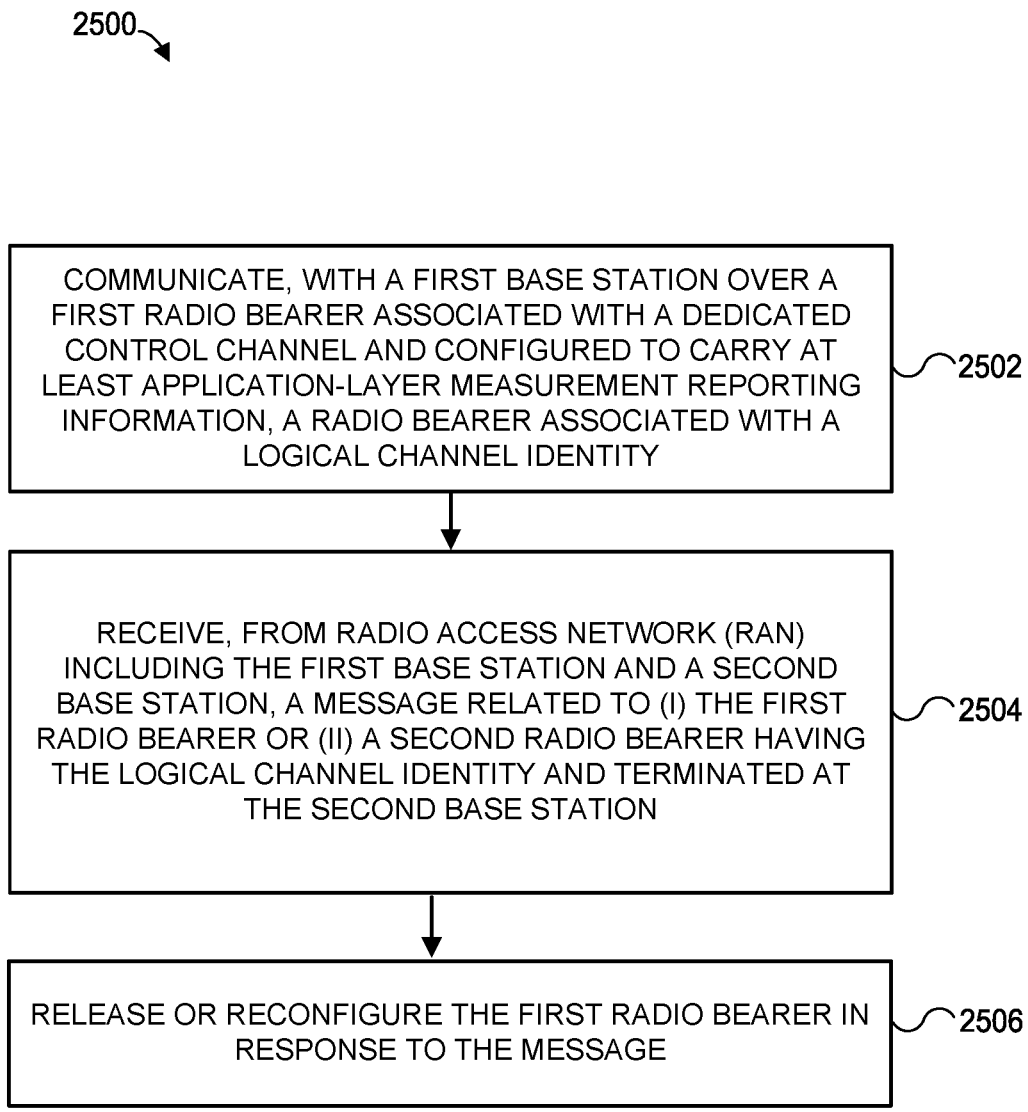
FIG. 25 is a flow diagram of an example method for managing radio bearers, which can be implemented in UE 102 of FIG. 1.

FIG. 25 depicts an example method 2500 for managing radio bearers, which can be implemented in UE 102 of FIG. 1.

The method 2500 begins at block 2502, where a UE communicates with a first base station over a first radio bearer associated with a dedicated control channel and configured to carry at least application-layer measurement reporting information, the radio bearer associated with a logical channel identity (events 211, 311, 411, 511, 611, 711, 811, 911, 1011, 1111, 1211, 1311, 1411, 1511, 1611, 1711, 1811 and 1911 of FIGS. 2A-2B and 3-18, 19A-19C). Subsequently, the UE at block 2504 receives, from a RAN including the first base station and a second base station, a message related to (i) the first radio bearer or (ii) a second radio bearer having the logical channel identity and terminated at the second base station (events 218, 220, 232, 318, 320, 319, 321, 418, 420, 518, 520, 617, 619, 737, 832, 833, 935, 1032, 1033, 1132, 1133, 1232, 1233, 1313, 1432, 1532, 1533, 1632, 1633, 1732, 1733, and 1807, 1937, and 1938 of FIGS. 2A-2B and 3-18, 19A-19C). In response to the message, the UE at block 2506 releases or reconfigures the first radio bearer (events 222, 322, 323, 422, 522, 523, 622, 722, 822, 823, 935, 1022, 1023, 1122, 1123, 1222, 1223, 1322, 1422, 1522, 1523, 1622, 1623, 1722, 1723, and 1822, and 1922 of FIGS. 2A-2B and 3-18, 19A-19C).

The following additional considerations apply to the foregoing discussion.

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code, or machine-readable instructions stored on non-transitory machine-readable medium) or hardware modules. A hardware module is a tangible unit capable of performing certain operations and may be configured or arranged in a certain manner. A hardware module can include dedicated circuitry or logic that is permanently configured (e.g., as a special-purpose processor, such as a field programmable gate array (FPGA) or an application-specific integrated circuit (ASIC), a digital signal processor (DSP)) to perform certain operations. A hardware module may also include programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

Upon reading this disclosure, those of skill in the art will appreciate still additional and alternative structural and functional designs for managing radio bearers through the principles disclosed herein. Thus, while particular embodiments and applications have been illustrated and described, it is to be understood that the disclosed embodiments are not limited to the precise construction and components disclosed herein. Various modifications, changes and variations, which will be apparent to those of ordinary skill in the art, may be made in the arrangement, operation and details of the method and apparatus disclosed herein without departing from the spirit and scope defined in the appended claims.

Aspect 1. A method in a UE for managing radio bearers, the method comprising: communicating, by processing hardware, with a first base station over a first radio bearer associated with a dedicated control channel and configured to carry at least application-layer measurement reporting information, the first radio bearer associated with a logical channel identity; receiving, by the processing hardware from a radio access network (RAN) including the first base station and a second base station, a message related to (i) the first radio bearer or (ii) a second radio bearer having the logical channel identity and terminated at the second base station; and releasing or reconfiguring, by the hardware, the first radio bearer in response to the message.

Aspect 2. The method of aspect 1, wherein: the message is associated with one of (i) a handover procedure, (ii) a procedure for re-establishing a radio connection, or (iii) a procedure for resuming a previously suspended radio connection; and the method includes releasing the first radio bearer in response to the message.

Aspect 3. The method of aspect 2, wherein the message includes a configuration for the second radio bearer.

Aspect 4. The method of aspect 2, wherein the message includes no configuration for the first radio bearer.

Aspect 5. The method of aspect 4, wherein the message includes a full configuration for a radio link between the UE and the second base station but no configuration for the first radio bearer.

Aspect 6. The method of aspect 2, wherein the message includes a dedicated field to indicate that the UE is to release the first radio bearer.

Aspect 7. The method of aspect 2, wherein the message includes system information related to the second base station, the system information indicating that the second base station does not support the first radio bearer.

Aspect 8. The method of any of aspects 1-7, wherein: the message is associated with a protocol for controlling radio resources and indicates that a radio link connection between the UE and the first base station is inactive.

Aspect 9. The method of any of aspects 1-7, wherein the message indicates a failure of one of (i) a radio link between the UE and the first base station, (ii) the handover procedure, or (iii) reconfiguration of the first radio bearer.

Aspect 10. The method of aspect 1, wherein: the message includes a full configuration or a delta configuration including configuration for the first radio bearer; and the method includes reconfiguring the first radio bearer in accordance with the full configuration or the delta configuration.

Aspect 11. The method of any of the preceding aspects, wherein the message includes one of: (i) a handover command when the message is associated with the handover procedure, or (ii) a reconfiguration command associated with a protocol for controlling radio resources when the message is associated with the procedure for re-establishing the radio connection, or (iii) a resume command associated with the protocol for controlling radio resources when the message is associated with the procedure for resuming the previously suspended radio connection.

Aspect 12. The method of aspect 1, further comprising: releasing the first radio bearer in response to determining that the message includes configuration for the second radio bearer that specifies the logical channel identity of the first radio bearer.

Aspect 13. The method of any of the preceding aspects, wherein: the first radio bearer is a signaling radio bearer 4 (SRB4), and the second radio bearer is a data radio bearer (DRB).

Aspect 14. A user device including processing hardware and configured to implement a method according to any of aspects 1-13.

Aspect 15. A method in a radio access network (RAN) including a first base station that supports radio bearers of a first type and a second base station that does not support radio bearers of the first type, the method comprising: determining, by processing hardware, that a user equipment (UE) configured with a first radio bearer of the first type, the radio bearer terminated at the first base station, is to obtain a radio connection to the second base station; and sending, by the processing hardware, a message to cause the UE to release the first radio bearer and establish a second radio bearer of a second type, terminated at the second base station.

Aspect 16. The method of aspect 15, wherein the first type is associated with a dedicated control channel and configured to carry at least application-layer measurement reporting information.

Aspect 17. The method of aspect 16, wherein: the first type is signaling radio bearer 4 (SRB4), and the second type is data radio bearer (DRB).

Aspect 18. The method of aspect 15, wherein: the message is associated with one of (i) a handover procedure, (ii) a procedure for re-establishing a radio connection, or (iii) a procedure for resuming a previously suspended radio connection; and the method includes releasing the first radio bearer in response to sending the message.

Aspect 19. The method of aspect 18, wherein the message includes a configuration for the second radio bearer.

Aspect 20. The method of aspect 18, wherein the message includes no configuration for the first radio bearer.

Aspect 21. The method of aspect 18, wherein the message includes a full configuration for a radio link between the UE and the second base station but no configuration for the first radio bearer.

Aspect 22. The method of aspect 18, wherein the message includes a dedicated field to indicate that the UE is to release the first radio bearer.

Aspect 23. The method of aspect 22, further comprising: receiving, from the UE, a measurement report over the first radio bearer of the first type; determining that the measurement report indicates that cell level measurement results satisfy a first threshold; and sending the message in response to the determining.

Aspect 24. The method of aspect 23, wherein the determining further comprises determining that the measurement report indicates that the cell level measurement results do not satisfy a second threshold that is higher than the first threshold.

Aspect 25. The method of aspect 22, further comprising: detecting that data activity over an established connection between the UE and the first base station does not satisfy a first threshold over a first interval of time; and sending the message in response to the determining.

Aspect 26. The method of aspect 25, wherein the detecting further comprises detecting that the data activity satisfies a second threshold over a second interval of time that is below the first threshold.

Aspect 27. The method of aspect 18, wherein the message includes system information related to the second base station, the system information indicating that the second base station does not support the first radio bearer.

Aspect 28. The method of any of aspects 15-27, wherein the message includes one of: (i) a handover command when the message is associated with the handover procedure, or (ii) a reconfiguration command associated with a protocol for controlling radio resources when the message is associated with the procedure for re-establishing the radio connection, or (iii) a resume command associated with the protocol for controlling radio resources when the message is associated with the procedure for resuming the previously suspended radio connection.

Aspect 29. A base station including processing hardware and configured to implement a method of any of aspects 15-28.

Aspect 30. A RAN including a first base station and a second base station and configured to implement a method of any of aspects 15-28.

What is claimed is:

1. A method in a User Equipment (UE) for managing radio bearers, the method comprising:
communicating, by the UE, with a first base station over a signaling radio bearer 4 (SRB4) associated with a dedicated control channel and configured to carry at least application-layer measurement reporting information, the SRB4 associated with a logical channel identity;
receiving, by the UE and from a radio access network (RAN) including the first base station and a second base station, a message related to a data radio bearer (DRB) having the logical channel identity and terminated at the second base station; and
releasing, by the UE, the SRB4 in response to the message.

2. The method of claim 1, wherein:
the message is associated with one of (i) a handover procedure, (ii) a procedure for re-establishing a radio connection, or (iii) a procedure for resuming a previously suspended radio connection.

3. The method of claim 2, wherein the message includes a full configuration for a radio link between the UE and the second base station but no configuration for the SRB4.

4. The method of claim 2, wherein the message includes a dedicated field to indicate that the UE is to release the SRB4.

5. The method of claim 1, wherein:
the message includes a full configuration or a delta configuration including configuration for the SRB4; and
the method includes reconfiguring the SRB4 in accordance with the full configuration or the delta configuration.

6. The method of claim 1, further comprising:
releasing the SRB4 in response to determining that the message includes a configuration for the DRB that specifies the logical channel identity of the SRB4.

7. A user device including processing hardware and configured to implement a method according to claim 1.

8. A method in a radio access network (RAN) including a first base station that supports radio bearers of a first type and a second base station that does not support radio bearers of the first type, the method comprising:
determining, by the RAN, that a user equipment (UE) configured with a signaling radio bearer 4 (SRB4), the radio bearer terminated at the first base station, is to obtain a radio connection to the second base station, wherein the first type is associated with a dedicated control channel and configured to carry at least application-layer measurement reporting information; and
sending, by the RAN, a message to cause the UE to release the SRB4 and establish a data radio bearer (DRB), terminated at the second base station.

9. The method of claim 8, wherein:
the message is associated with one of (i) a handover procedure, (ii) a procedure for re-establishing a radio connection, or (iii) a procedure for resuming a previously suspended radio connection; and
the method includes releasing the SRB4 in response to sending the message.

10. The method of claim 9, wherein the message includes a full configuration for a radio link between the UE and the second base station but no configuration for the SRB4.

11. The method of claim 9, wherein the message includes a dedicated field to indicate that the UE is to release the SRB4.

12. The radio access network including the first base station and the second base station and configured to implement the method of claim 8.

* * * * *